(12) United States Patent
Galloup

(10) Patent No.: US 12,716,875 B1
(45) Date of Patent: Aug. 25, 2026

(54) MATERIAL SELECTION SYSTEM AND METHOD FOR CONSTRUCTING A MUSICAL INSTRUMENT

(71) Applicant: Bryan John Galloup, Big Rapids, MI (US)

(72) Inventor: Bryan John Galloup, Big Rapids, MI (US)

( * ) Notice: Subject to any disclaimer, the term of this patent is extended or adjusted under 35 U.S.C. 154(b) by 374 days.

(21) Appl. No.: 18/206,036

(22) Filed: Jun. 5, 2023

Related U.S. Application Data

(63) Continuation-in-part of application No. 16/569,328, filed on Sep. 12, 2019, now Pat. No. 11,668,678.
(Continued)

(51) Int. Cl.
*G01N 29/46* (2006.01)
*G01N 29/12* (2006.01)
(Continued)

(52) U.S. Cl.
CPC ............ *G01N 29/46* (2013.01); *G01N 29/12* (2013.01); *G01N 29/223* (2013.01);
(Continued)

(58) Field of Classification Search
CPC ..... G01N 2291/014; G01N 2291/0238; G01N 2291/102; G01N 2291/2698;
(Continued)

(56) References Cited

U.S. PATENT DOCUMENTS 4,926,350 A 5/1990 Bechtel et al.
5,024,091 A * 6/1991 Pellerin ................ G01N 29/045 73/602

(Continued)

FOREIGN PATENT DOCUMENTS

CN 101793873 A 8/2010
DE 202004007637 U1 * 7/2004 ........... G01N 29/275

(Continued)

OTHER PUBLICATIONS

Miao, Y., Zhong, M., Liu, Z., and Sun, F., "Analysis of wood vibration energy attenuation based on FFT vibration signal", BioResources, vol. 10(1), pp. 272-281, published Nov. 17, 2014.

(Continued)

*Primary Examiner* — David L Singer
(74) *Attorney, Agent, or Firm* — The Law Office of Patrick F. O'Reilly III, LLC

(57) ABSTRACT

Material selection systems and methods for constructing a musical instrument and/or where a selected material is a wood material are disclosed. One example material selection system includes a rating module and a rating database. The rating module includes an excitation device configured to act upon material samples; a vibration receiver in cooperation with the excitation device; a rating computer coupled to the vibration receiver, the rating computer configured to execute stored instructions for determining a set of material sample ratings based on a transform analysis of data collected by the vibration receiver; and an output device operatively coupled to the rating computer, the output device configured to output the determined set of material sample ratings to a rating database. Each set of material sample ratings is associated with a material sample. Another example material selection system may further include a selection module with a selection computer coupled to the rating database.

19 Claims, 30 Drawing Sheets

Related U.S. Application Data

(60) Provisional application No. 62/730,513, filed on Sep. 12, 2018.

(51) Int. Cl.
*G01N 29/22* (2006.01)
*G01N 29/44* (2006.01)
*G06F 17/14* (2006.01)
*G10D 1/08* (2006.01)
*G10D 3/22* (2020.01)

(52) U.S. Cl.
CPC ..... *G01N 29/4427* (2013.01); *G01N 29/4472* (2013.01); *G10D 1/08* (2013.01); *G10D 3/22* (2020.02); *G01N 2291/014* (2013.01); *G01N 2291/0238* (2013.01); *G01N 2291/102* (2013.01); *G01N 2291/2698* (2013.01); *G06F 17/142* (2013.01); *Y10T 29/49574* (2015.01)

(58) Field of Classification Search
CPC .... G01N 29/041; G01N 29/12; G01N 29/223; G01N 29/4472; G01N 29/46; G01N 29/045; G01N 29/4427; G06F 17/142; G10D 1/08; G10D 3/22; Y10T 29/49574; G10C 9/00
See application file for complete search history.

(56) References Cited

U.S. PATENT DOCUMENTS 5,060,516 A 10/1991 Lau et al.
5,544,256 A 8/1996 Brecher et al.
6,087,568 A 7/2000 Seal
6,220,743 B1 4/2001 Campestre et al.
6,320,113 B1 11/2001 Griffin et al.
6,667,429 B2 12/2003 Abe et al.
6,779,404 B1 8/2004 Brincker et al.
6,782,732 B2 8/2004 Huang et al.
7,005,570 B2 2/2006 Nishitani et al.
7,406,190 B2 7/2008 Carman et al.
7,426,422 B2 9/2008 Carman et al.
8,642,877 B1 * 2/2014 Blish ........................ G10H 3/22 84/723
8,655,628 B2 2/2014 Cone
9,349,354 B1 5/2016 Galloup
9,502,006 B1 11/2016 Galloup
9,519,733 B2 * 12/2016 Summit .................. G06F 30/00
11,668,678 B1 6/2023 Galloup
2003/0066412 A1 4/2003 Nishitani et al.
2005/0011263 A1 1/2005 Harris
2014/0100825 A1 4/2014 Summit
2015/0221292 A1 * 8/2015 Piper ........................ G10G 5/00 29/559

FOREIGN PATENT DOCUMENTS

WO 9613702 A1 5/1996
WO 2010148431 A1 12/2010

OTHER PUBLICATIONS

A. Danihelová et al. “Modified Wood of Black Locust—Alternative to Honduran Rosewood in the Production of Xylophones”, Acta Physica Polonica A, vol. 127(1), pp. 106-109 (Jan. 2015).
“Voicing and Tap Tuning of Acoustic Guitars”, Dogwood Guitars Website, Web page <http://dogwoodguitars.com/voicing-and-tap-tuning/>, 8 pages, dated at least as early as Jul. 8, 2015, retrieved from dogwoodguitars.com website on Oct. 27, 2022.
Catgut Acoustical Society Journal vol. 2, No. 7 (Series II) May 1995 (Year: 1995).
Aramaki et al, Controlling the Perceived Material in an Impact Sound Synthesizer, IEEE Transactions On Audio, Speech, and Language Processing, vol. 19, No. 2, Feb. 2011 (Year: 2011).
Lucchimeter.com, Wayback Machine 2016 archived version (Year: 2016).
Carlier et al., Revisiting the notion of “resonance wood” choice: a de-compartementalised approach from violin makers’ opinion and perception to characterization of material properties’ variability, (Year: 2019).
Pioneer Hill Software LLC, SpectraPLUS (Year: 2016).
Kitto, AC 2008-354: Teaching Basic Materials Engineering Design To Engineering Technology Students Using Stringed Instrument Top Design, American Society for Engineering Education, 2008 (Year: 2008).
Fender Custom Shop, Tone Wood: Necks, YouTube https://www.youtube.com/watch?v=rAxvKw-wg-Y Transcript (Year: 2012).
Tony Oldhand, Acoustical Properties of Woods, Our Pastimes (Year: 2017).
Spycher et al, Assessment of resonance wood quality by comparing its physical and histological properties, Wood Sci Technol (2008) 42:325-342 DOI 10.1007/s00226-007-0170-5 (Year: 2008).
Chris Mcarthy, Idioms using numbers, EC English Language Centres (Year: 2008).
Perfect 10—Idioms, The Free Dictionary (Year: 2022).
First office action on the merits (Non-Final Rejection) in U.S. Appl. No. 16/569,328, mailed on May 25, 2022.
Office Action Appendix to first office action on the merits (Non-Final Rejection) in U.S. Appl. No. 16/569,328, mailed on May 25, 2022.
Notice of Allowance in U.S. Appl. No. 16/569,328, mailed on Jan. 23, 2023.

* cited by examiner

1500

MATERIAL SELECTION SYSTEM AND METHOD FOR CONSTRUCTING A MUSICAL INSTRUMENT

CROSS-REFERENCE TO RELATED APPLICATIONS

This patent application is a continuation-in-part of U.S. Nonprovisional patent application Ser. No. 16/569,328, entitled "Material Selection System And Method For Constructing A Musical Instrument", filed on Sep. 12, 2019, which claims the benefit of U.S. Provisional Patent Application No. 62/730,513, entitled "Material Selection System And Method", filed on Sep. 12, 2018, all of the disclosures of which are herein expressly incorporated by reference in their entireties.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

Technical Field

The present invention generally relates to systems and methods for selecting materials for constructing a musical instrument. More particularly, the present invention relates to systems and methods that employ conducting a fast Fourier transform ("FFT") analysis for each of a plurality of material samples, storing FFT analysis results of the plurality of material samples in a database, and recommending a specific one of the plurality of samples for use in constructing a musical instrument.

Background and Description of Related Art

Tones produced by an acoustic musical instrument are greatly influenced by the characteristics and qualities of the materials from which the instrument is constructed. Traditionally, acoustic musical instruments have been constructed from various types of wood, such as, for example, spruce, cedar, mahogany, maple, rosewood, as well as various exotic woods. Each type of wood may be selected, at least in part, for its appearance, material properties, acoustic properties, cost, rarity or other considerations.

For many musicians, acoustic properties are of primary importance in material selection. For luthiers, instrument builders, considerations of physical properties, such as strength, flexibility and elasticity, for example, are also important for material selection to ensure durability and structural soundness of the instrument. Of course, the location and function of a particular component is also an important consideration in material selection.

Regardless of the general characteristics of a particular species of wood, each specific sample of wood has its own unique characteristics and considerations. For example, a specific sample of wood may have been subjected to environmental factors that have changed the quality of the wood, for better or worse, so that it no longer falls within expected tolerances for its particular variety or species.

Accordingly, a need therefore exists for a system that selects a specific material sample for use in constructing an acoustic musical instrument based on a user's preferred characteristics. A further need exists for a system that rates a specific material sample for use in constructing an acoustic musical instrument.

SUMMARY OF EXAMPLE EMBODIMENTS

Accordingly, the present invention is directed to a material selection system and a method for selecting a material that substantially obviates one or more problems resulting from the limitations and deficiencies of the related art.

In accordance with one or more embodiments of the present invention, there is provided a first material selection system comprising: (i) a rating module, (ii) a rating database and (iii) a selection module. The rating module comprises an excitation device configured to act upon each of a plurality of material samples; a vibration receiver in cooperation with the excitation device; a rating computer coupled to the vibration receiver, the rating computer configured to execute stored instructions for determining a set of material sample ratings based on a fast Fourier transform ("FFT") analysis of data collected by the vibration receiver; and an output device operatively coupled to the rating computer, the output device configured to output the determined set of material sample ratings.

The rating database is configured to receive and store a plurality of sets of material sample ratings. Each set of material sample ratings is associated with a material sample.

The selection module comprises a selection computer coupled to the database and a user interface. The selection computer is configured to execute stored instructions for selecting a specific material sample based on user-preferred material characteristics. The user interface is configured to receive the user-preferred material characteristics; and transmit an identification of the selected specific material sample.

The rating computer of the first material selection system may determine a Galloup Base 10 Ratio.

The rating computer of the first material selection system may determine a Base Scaled Ratio.

The rating computer of the first material selection system may determine a deflection prediction.

The rating computer of the first material selection system may determine a mass prediction.

In accordance with one or more embodiments of the present invention, there is provided a second material selection system comprising: (i) an excitation device configured to act upon material sample; (ii) a vibration receiver in cooperation with the excitation device; (iii) a rating computer coupled to the vibration receiver; and (iv) an output device operatively coupled to the rating computer.

The rating computer is configured to execute stored instructions for determining a set of ratings associated with the material sample. The set of ratings may include material sample ratings based on FFT analysis of data collected by the vibration receiver. The output device is configured to output the determined set of material sample ratings.

The second material selection system may further comprise: (v) a rating database and (vi) a selection module. The rating database is configured to receive and store a plurality of sets of material sample ratings. Each set of material sample ratings is associated with a material sample. The selection module comprises a selection computer coupled to the database; and a user interface. The selection computer is configured to execute stored instructions for selecting a specific material sample based on user-preferred material characteristics. The user interface is configured to receive the user-preferred material characteristics; and transmit an identification of the selected specific material sample.

BRIEF DESCRIPTION OF THE DRAWINGS

The invention will now be described, by way of example, with reference to the accompanying drawings, which are incorporated in and constitute a part of the specification, in which.

DRAWING REFERENCE NUMERALS

Figure 1:
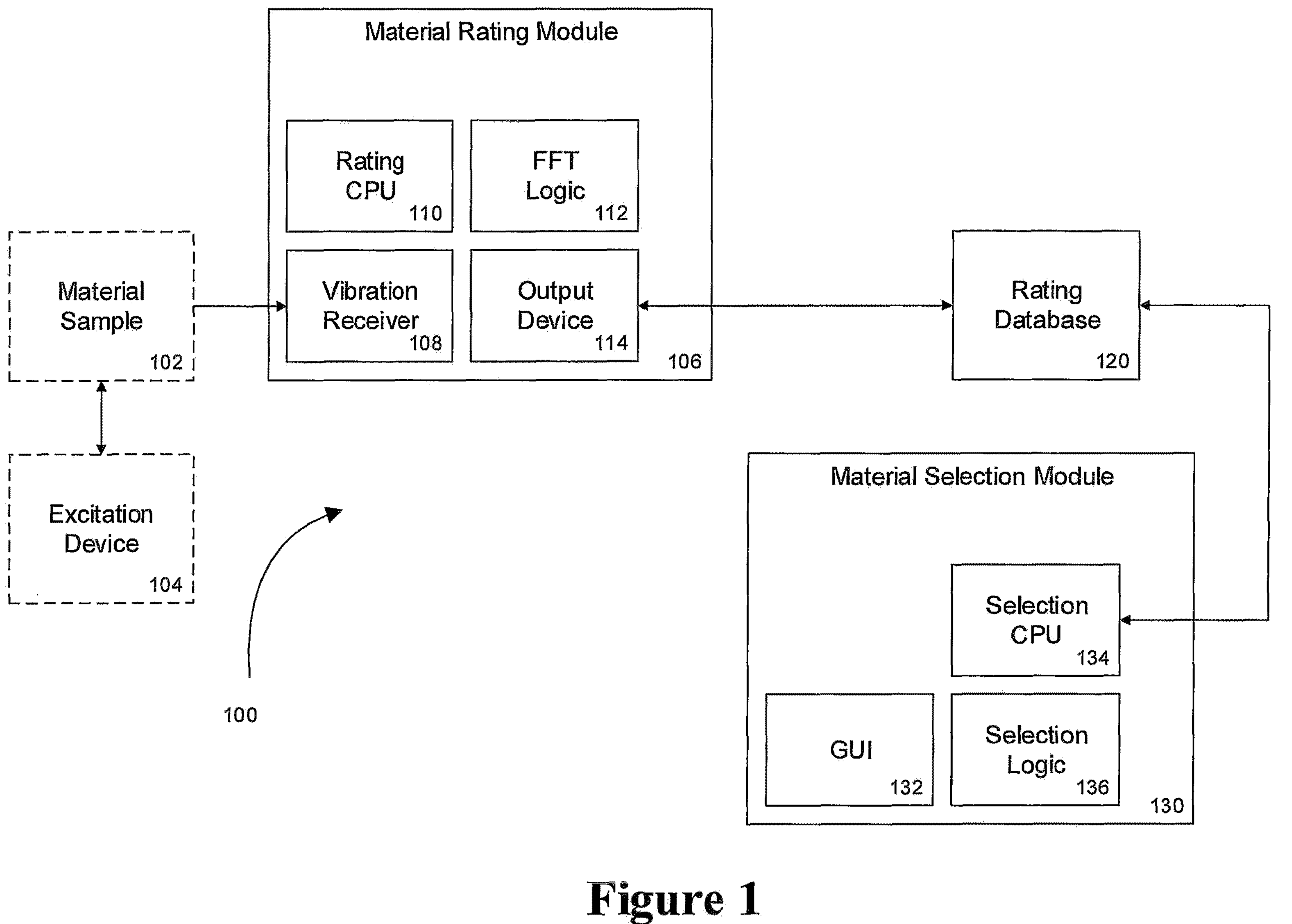
FIG. 1 is a schematic block diagram of an example material selection system.
Figure 2:
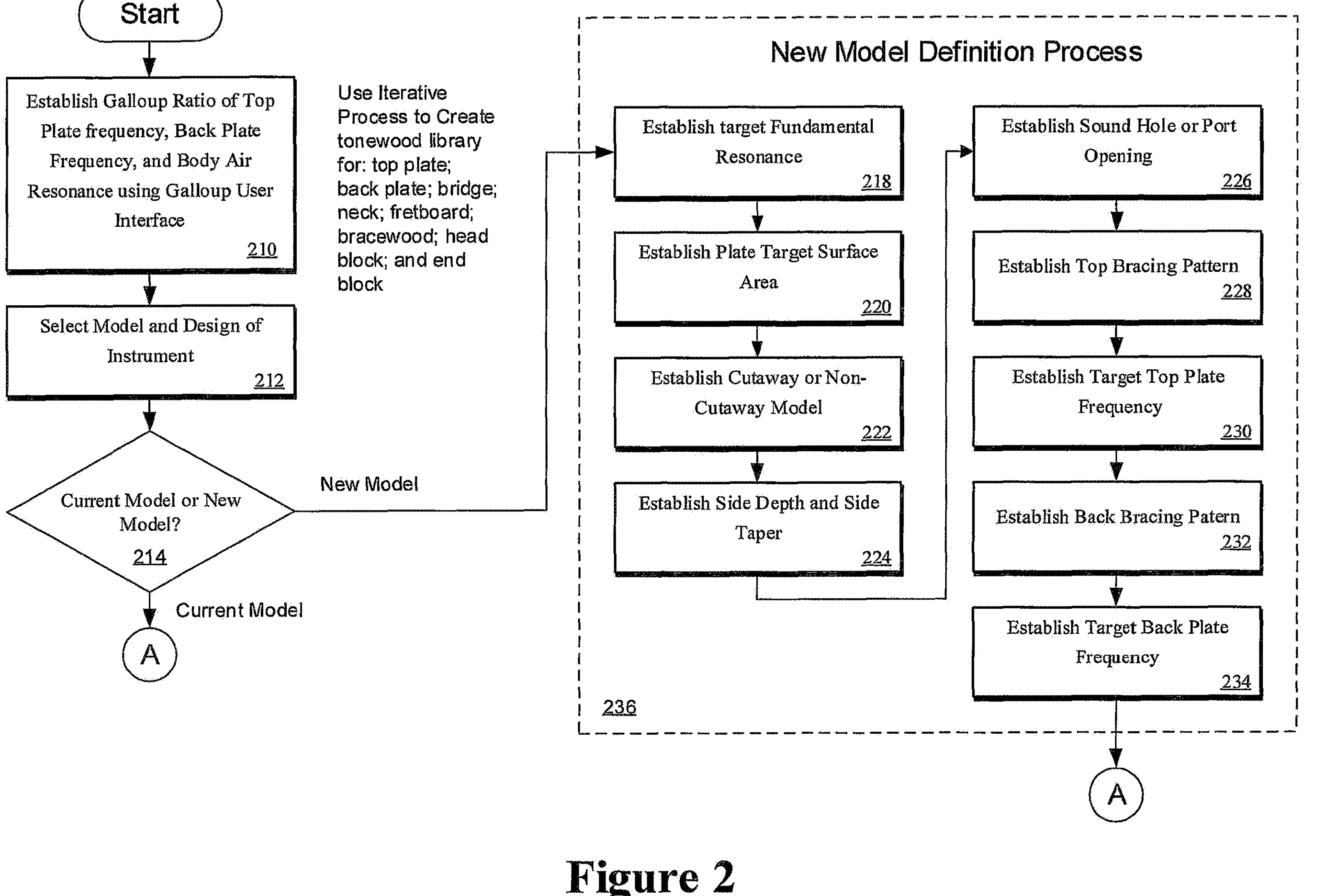
FIGS. 2-10 depict steps of an example method for constructing a musical instrument using the example material selection system.
Figure 3:
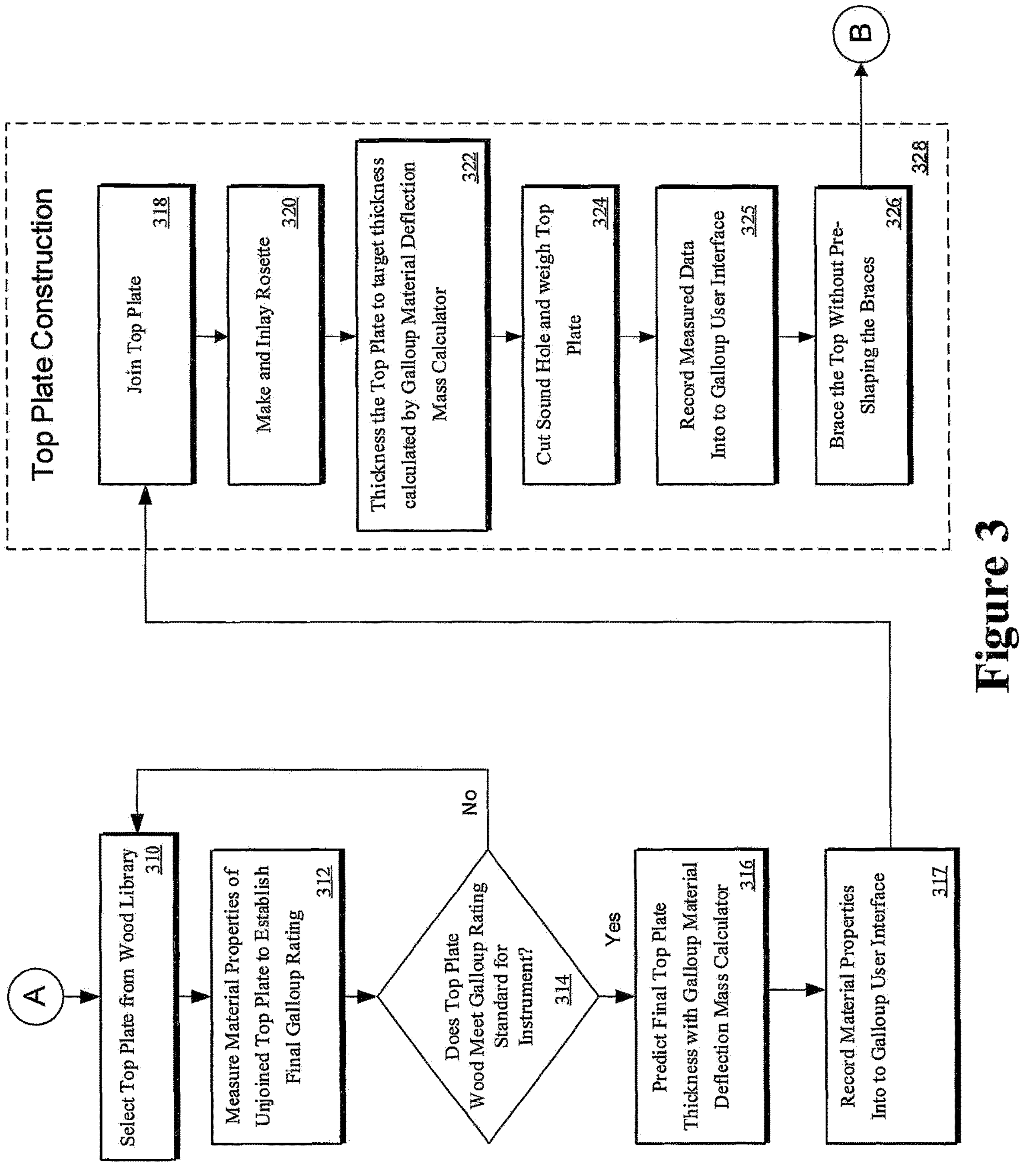
Figure 4:
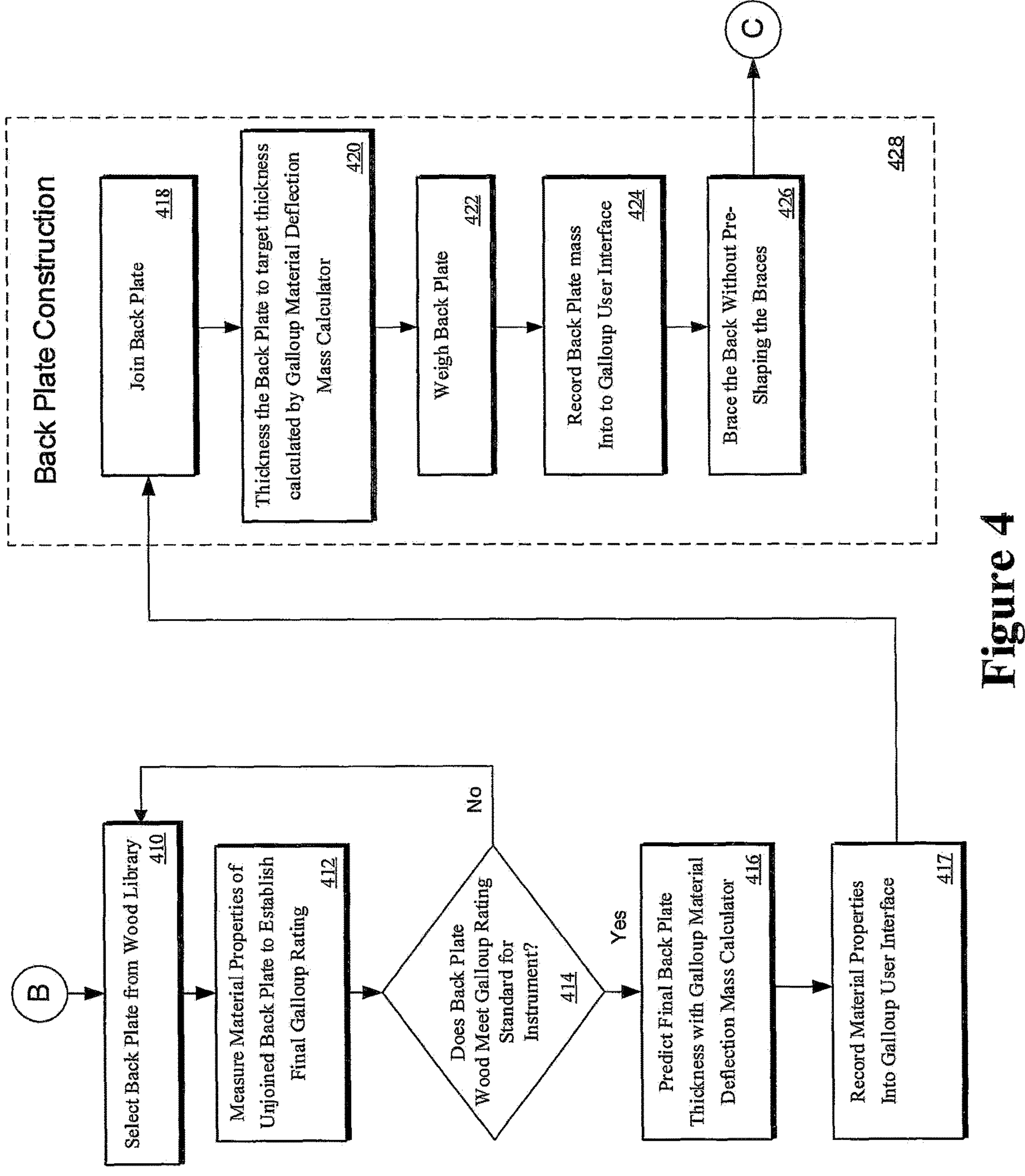
Figure 5:
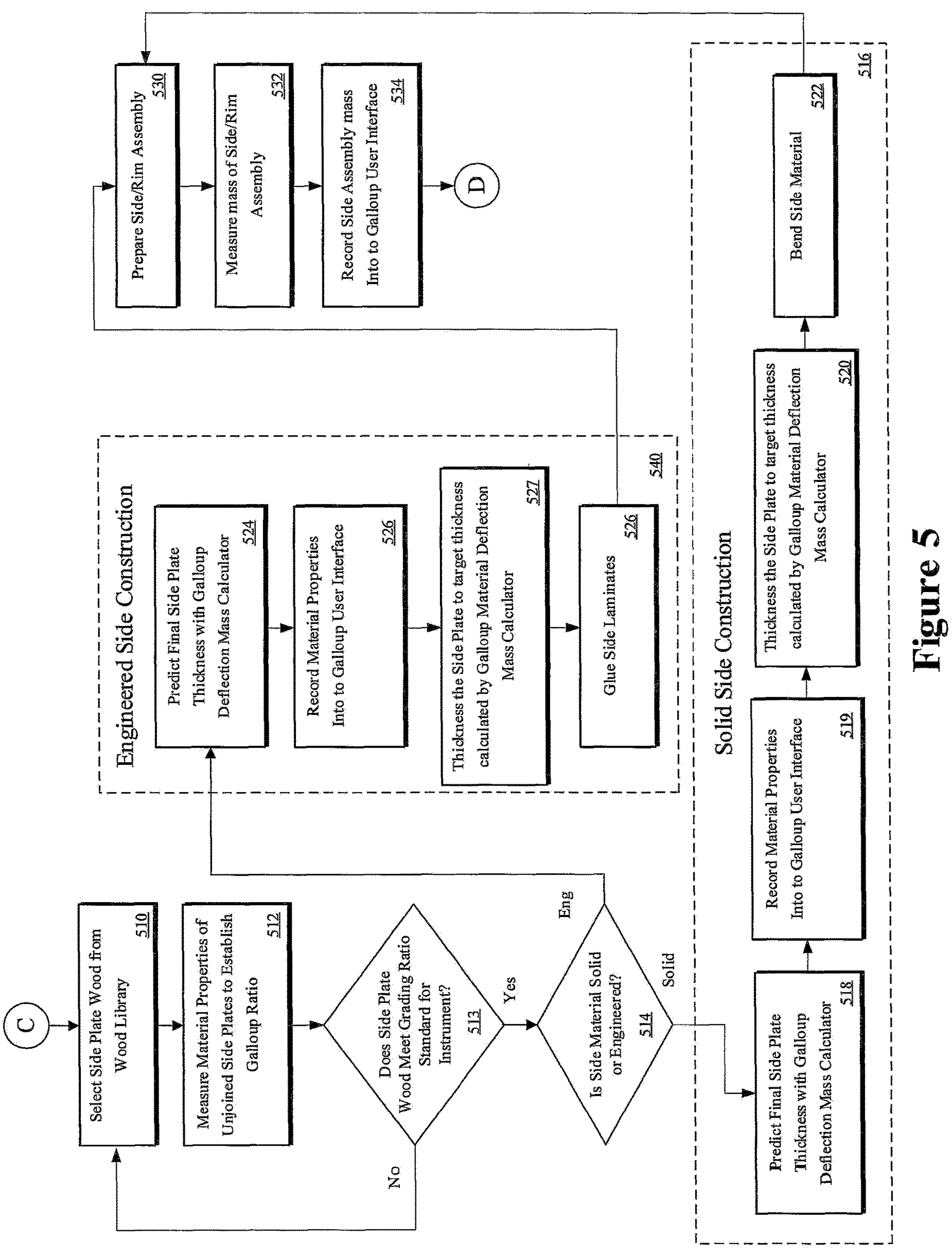
Figure 6:
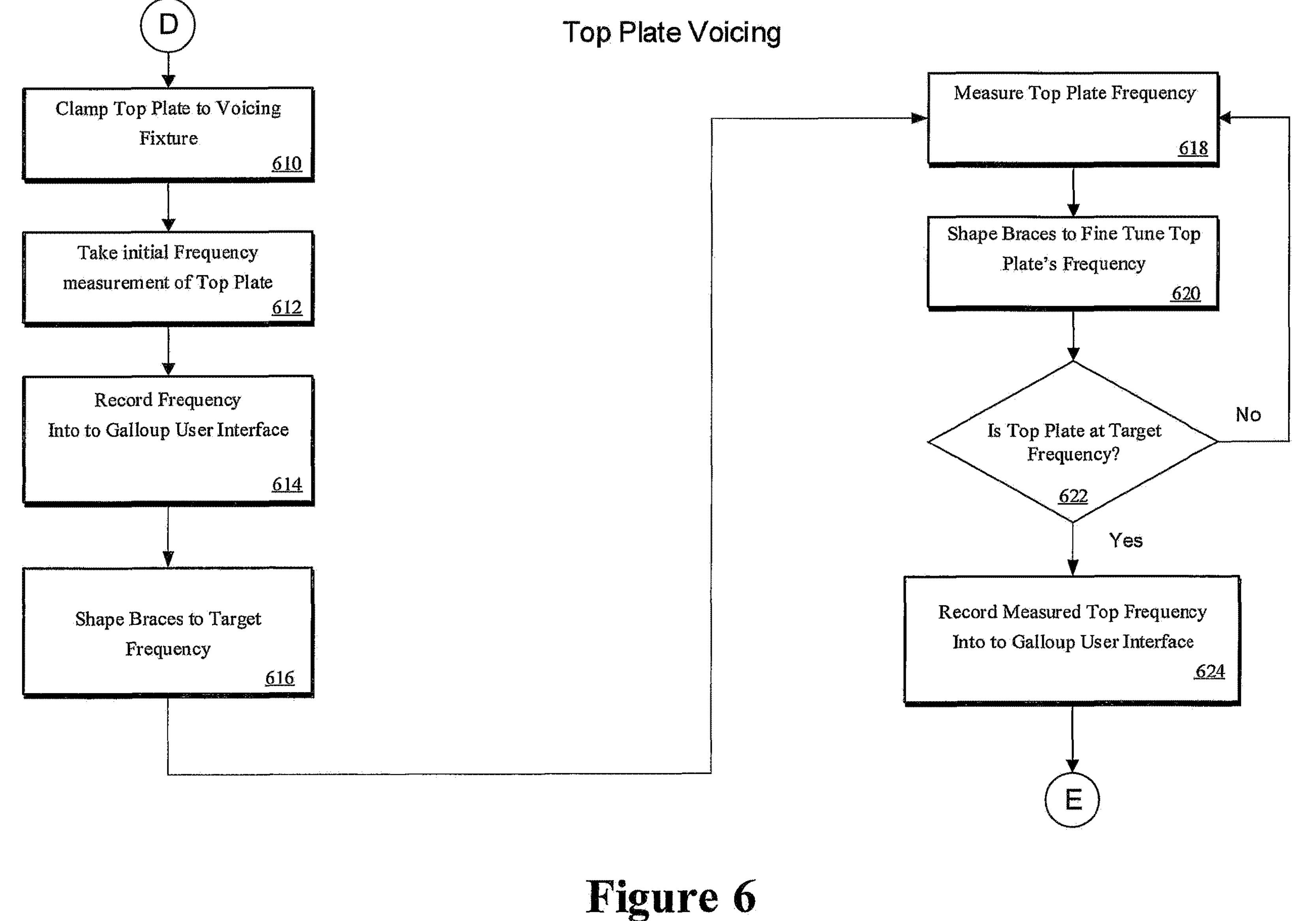

The following reference characters identify the associated elements depicted in the drawings describing the present invention:

| | |
|---|---|
| 100 | Material Selection System |
| 102 | Material Sample |
| 104 | Excitation Device |
| 106 | Material Rating Module |
| 108 | Vibration Receiver |
| 110 | Rating CPU |
| 112 | FFT / Rating Logic |
| 114 | Output Device |
| 120 | Rating Database |
| 130 | Material Selection Module |
| 132 | GUI |
| 134 | Selection CPU |
| 136 | Selection Logic |
| 210-1018 | Steps of the Example Method For Constructing A Musical Instrument |
| 1100 | First Screen Image |
| 1200 | Second Screen Image |
| 1300 | Third Screen Image |
| 1400 | Fourth Screen Image |
| 1500 | Fifth Screen Image |
| 1600 | Material Testing Assembly |
| 1602 | Support Base of Testing Assembly |
| 1604 | Support Bracket |
| 1606 | Slidable Bar |
| 1608 | "V"-Shaped Cutout in Slidable Bar |
| 1610 | Air Nozzle Support Member |
| 1612 | Air Nozzle |
| 1614 | Transducer |
| 1616 | Dowel Rod |
| 1618 | Drum Stick |
| 1700 | Material Testing Assembly |
| 1702 | Support Base of Testing Assembly |
| 1704 | Base Support Leg |
| 1706 | Sonic Driver |
| 1708 | Threaded Rod of Sonic Driver |
| 1710 | Air Nozzle Support Member |
| 1712 | Air Nozzle |
| 1714 | Transducer |

-continued

| | |
|---|---|
| 1716 | Support Pin |
| 1718 | Sheet of Wood |
| 1800 | Material Testing Assembly |
| 1802 | Support Base of Testing Assembly |
| 1804 | Sonic Driver |
| 1806 | Semi-Circular Recess in Sonic Driver |
| 1808 | Transducer |
| 1810 | Semi-Circular Recess in Transducer |
| 1812 | Dowel Rod |
| 1814 | Drum Stick |
| 1900 | Material Support Cradle |
| 1902 | Base of Support Cradle |
| 1904 | Upright Member of Support Cradle |
| 1906 | Square Stock |
| 1908 | Round Stock |
| 1910 | Baseball Bat |
| 2000 | Material Support Cradle |
| 2002 | Base of Support Cradle |
| 2004 | Upright Member of Support Cradle |
| 2006 | Square Stock |
| 2008 | Dowel Rod |
| 2010 | Drum Stick |
| 2100 | Material Support Cradle |
| 2102 | Base of Support Cradle |
| 2104 | Upright Member of Support Cradle |
| 2106 | Material Sample |
| 2200 | Material Testing Assembly |
| 2102 | Base of Support Cradle |
| 2204 | Upright Member of Support Cradle |
| 2206 | Top Support and Sensor |
| 2208 | Bottom Support |
| 2210 | Air Nozzle in Bottom Support |
| 2212 | Square Stock |
| 2214 | Dowel Rod |
| 2216 | Drum Stick |

DETAILED DESCRIPTION

To address the deficiencies of the prior art, the present application discloses a material rating system, a material selection system, a method for rating material and a method for selecting material for constructing a musical instrument.

As shown in FIG. 1, there is illustrated an example material selection system 100. Material selection system 100 generally includes three elements: a material rating module 106; a rating database 120 and a material selection module 130.

The material rating module 106 rates a material sample 102 based on characteristics exhibited upon the sample's interaction with excitation device 104. Material rating system 100 comprises a vibration receiver 108, a rating central processing unit ("CPU") 110, FFT and rating Logic 112, and an output device 114. The vibration receiver (e.g., a microphone or other type of vibration sensor) detects and receives vibrations generated by the material sample 102 upon interaction with the excitation device 104. For example, the excitation device may constitute a shaker device for exciting the material sample. The detected vibrations are analyzed by rating CPU 110 which processes the vibrations in accordance with fast Fourier transform ("FFT") logic and other rating logic 112. The ratings processed by the CPU 110 and FFT logic 112 are transmitted by output device 114 (e.g., an output port) to the rating database 120. For example, the material sample ratings in the rating database 120 may comprise the different ratings included in the "Search by Ratings" section of the screen image 1200 in FIG. 12, such as "Galloup Rating Twist (xy)", "Galloup Rating Long (x)", "Galloup Rating Cross (y)", etc.

Upon successively employing material rating module 106 to rate a plurality of material samples 102 (e.g., wood board samples), rating database 120 is a repository of an inventory of samples that may be used in the construction of a musical instrument. For example, the rating database 120 may comprise a plurality of board samples with different ratings and material parameters, such as "RC Long", "RC Cross", "RC Twist", etc. (e.g., see bottom section of the screen image 1200 in FIG. 12. Once rating database 120 has been sufficiently populated with ratings of a plurality of material samples, it may be used in conjunction with material selection module 130 to determine an advantageous selection of materials with which to construct a musical instrument.

Material selection module 130 comprises a Graphical User Interface ("GUI") through which it collects and reports information pertaining to the material selection process. The information collected and reported by the GUI 132 is more specifically depicted in FIGS. 11 and 13. Upon collecting information from a user via the GUI 132, selection CPU 134 processes the information in accordance with selection logic 136. Upon processing the information, the selection CPU 134 reports to the user a preferred selected material sample via the GUI 132. For example, with reference to the "Search Calibration Values", "Search by Ratings", "Search by Source", and "Search by Density" sections of the screen image 1200 in FIG. 12, the selection CPU 134 may select the material sample (e.g., a wood board) based upon a plurality of different selection criteria, such as frequency and/or dimensional parameters of the wood board, rating parameters associated with the wood board, source criteria associated with the wood board, and/or density parameters of the wood board.

The FFT and rating Logic 112 processed by the rating CPU 110 utilizes the following input measurements and performs the following calculations:

1. Material sample dimensions are measured. Specifically, length, width and thickness of the sample are measured. Length and width measurements may be rounded to the nearest 0.010" and thickness may be averaged from 15 points across the sample to the nearest 0.001".

2. The mass of the material sample is measured using an accurate scale. For example, mass may be measured to the nearest 0.1 of a gram.

3. Other characteristics of the sample are measured. For example, long, cross, and twisting sample modes may be measured. Using FFT software, the three fundamental modes of the sample may be measured to the nearest 0.1 hz.

4. Sample density may be calculated using the measurements outlined in step 1 and 2. Density may be calculated in $lbs/ft^3$ and $kg/m^3$.

5. Young's Modulus along the grain may be calculated as follows:

$Ex=((d*Lx^4*fx^2)/(384*1.05*h^2))$ d=density (lbs/in3)

Lx=length of plate with the grain (inches)

fx=frequency of (0,2) mode (hz)

h=thickness of plate (inches)

6. Young's Modulus across the grain may be calculated as follows:

$Ex=((d*Ly^4*fy^2)/(384*1.05*h^2))$ d=density (lbs/in3)

Ly=length of plate across the grain (inches)

fy=frequency of (2,0) mode (hz)

h=thickness of plate (inches)

7. Twisting modulus (Shear modulus)

$=(d*(Ly^2)*(Lx^2)*(fxy^2))/(384*1.05*(h^2))$ d=density (lbs/in3)

Ly=length of plate across the grain (inches)

Lx=length of plate with the grain (inches)

fxy=frequency of (1,1) mode (hz)

h=thickness of plate (inches)

8. The speed of sound along each axis may be calculated as follows:

$S=\sqrt{(E/d)}$

S=speed of sound (m/sec)

E=modulus of elasticity ($N/m^2$)

d=density ($kg/m^3$)

Modulus values may be converted from standard (psi) to metric ($N/m^2$) by multiplying by 6895.

9. The radiation coefficient for each axis may be calculated as follows:

Rc=Speed of sound along an axis/density

Sx=Speed of sound along an axis (m/sec)

d=Density (kg/m^3)

10. A "Galloup Base 10 Ratio" may also be calculated. The Galloup Base 10 Ratio is set by establishing a hypothetical "best" value for a sample and scaling it to the number ten. All real values are then scaled to match the base ten ratio. For the Galloup Base 10 Ratio along the grain, a value of 14 m^4/kg·s may be considered as the theoretical maximum. For the Galloup Base 10 Ratio across the grain, a value of 4 m^4/kg·s may be considered the theoretical minimum.

11. A Base Scaled Ratio may also be calculated. The Base Scaled Ratio takes into account the material properties of the material sample (e.g., a wood board sample) where weight and stiffness affects the values.

In addition to the above described calculations, material rating CPU 110 may also calculate a Deflection Mass value.

A method for arriving at the plate's final thickness is useful to help standardize the performance of a finished guitar. This is accomplished by thinning the joined plate to a stiffness criterion as opposed to an arbitrary thickness. By loading the plate in the center of a known span with a known force and measuring the deflection, you are able to measure the stiffness of the plate. As the plate is thinned, a deflection reading is taken every 0.005" of material removed and when the desired amount of deflection is reached, the plate is said to be at its final thickness.

If the modulus of elasticity is known, it is possible to predict the amount of deflection before the plate has been joined, thus saving the need to physically deflect each top. The amount of deflection may be predicted in each plate every 0.001" of thickness.

If the density is known, it is possible to calculate the amount of mass a plate will have at its final thickness or its effective density. If the effective density or mass per square inch is known, the total mass of the top plate for any guitar with a known surface area may be predicted.

For the Galloup method, a deflecting span of 18" is chosen for measurement along the grain and a deflecting span of 10" is chosen for measurement across the grain. A mass of 1330 g is the load and the deflection is measured in the center of the span. The plate halves should be joined and dimensioned to 16" wide and 22" long To predict the deflection, the material rating CPU 110 may use the equation for static determination of modulus of elasticity along the grain:

Ex=((0.25*W*Lx^3)/(y*Ly*h^3))

Where:

Ex=modulus along the grain

W=Force applied to plate (lbs)

Lx=Distance between fixed supports perpendicular to grain (inches)

y=Deflection (inches)

Ly=width of plate perpendicular to Lx (inches)

h=Thickness of plate (inches)

This equation may be rearranged to solve for y(deflection) giving:

y=(0.25*W*Lx^3)/(Ex*Ly*h^3)

The amount of deflection is then predicted for every 0.001" of thickness removed starting at 0.135" through 0.070"

Predicting the mass/in^2 (effective density)

Effective density=d*h where:

d=Density (g/in^3)

h=thickness (in)

Mass/in^3 is predicted for every 0.001" of thickness removed starting at 0.135" through 0.070".

By multiplying the density by the total surface area of the guitar face, one can predict the overall mass of the top plate at its final thickness.

According to one aspect of the present application, employing FFT allows the system to determine peaks in the frequency content of the material/wood and ensure improved strength to weight ratio. Generally, the system of the present application: 1) Determines the dimensions and weight of the material, including, for example, inputting L, W, thickness in software; 2) Determines the frequency content of the wood, for example, as recorded by a microphone; 3) Provides ability to manually enter/load in frequencies in the software 35.0 Hz/69.0 Hz/125 Hz; 4) Provides ability for user to initiate calculation, such as using the "Calculate" button in a GUI (see e.g., FIG. 11).

The Galloup rating and prediction provides a mechanism for a user to determine a relative quality of a sample. According to one example scale, a rating of 15=superior wood rating, and a rating of 10=Very good top. Generally, ratings above 10 are preferable.

Figure 7:
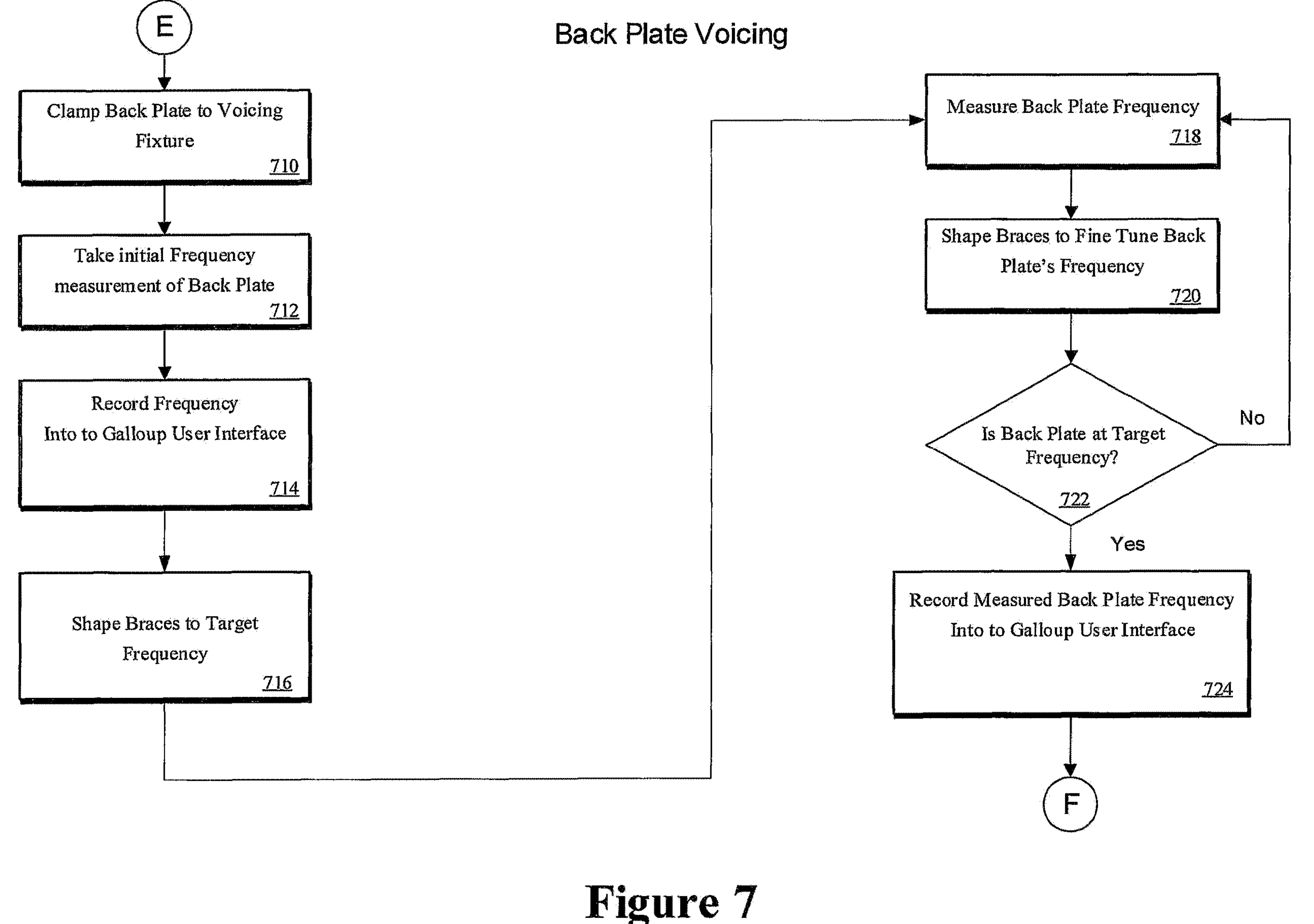
Figure 8:
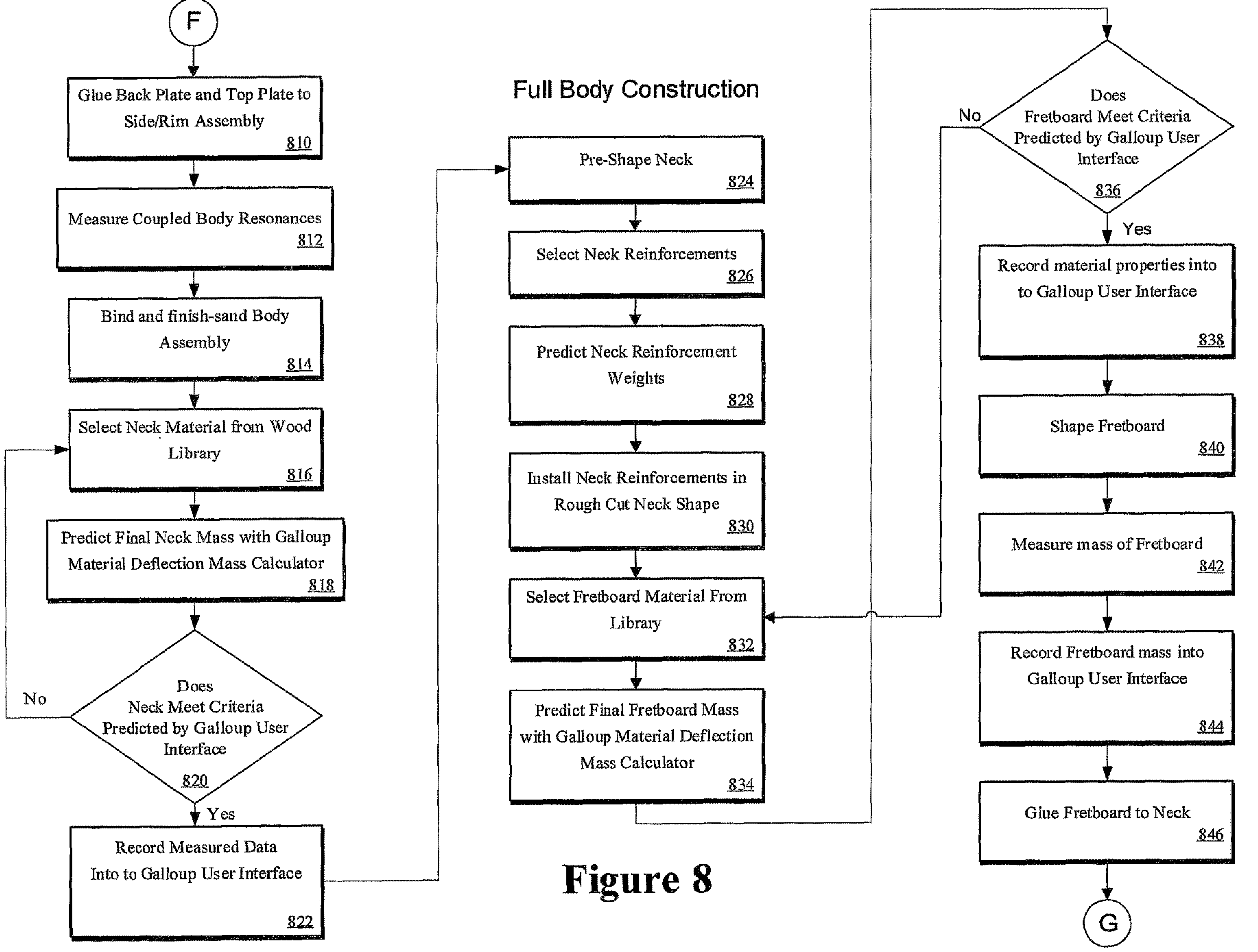
Figure 9:
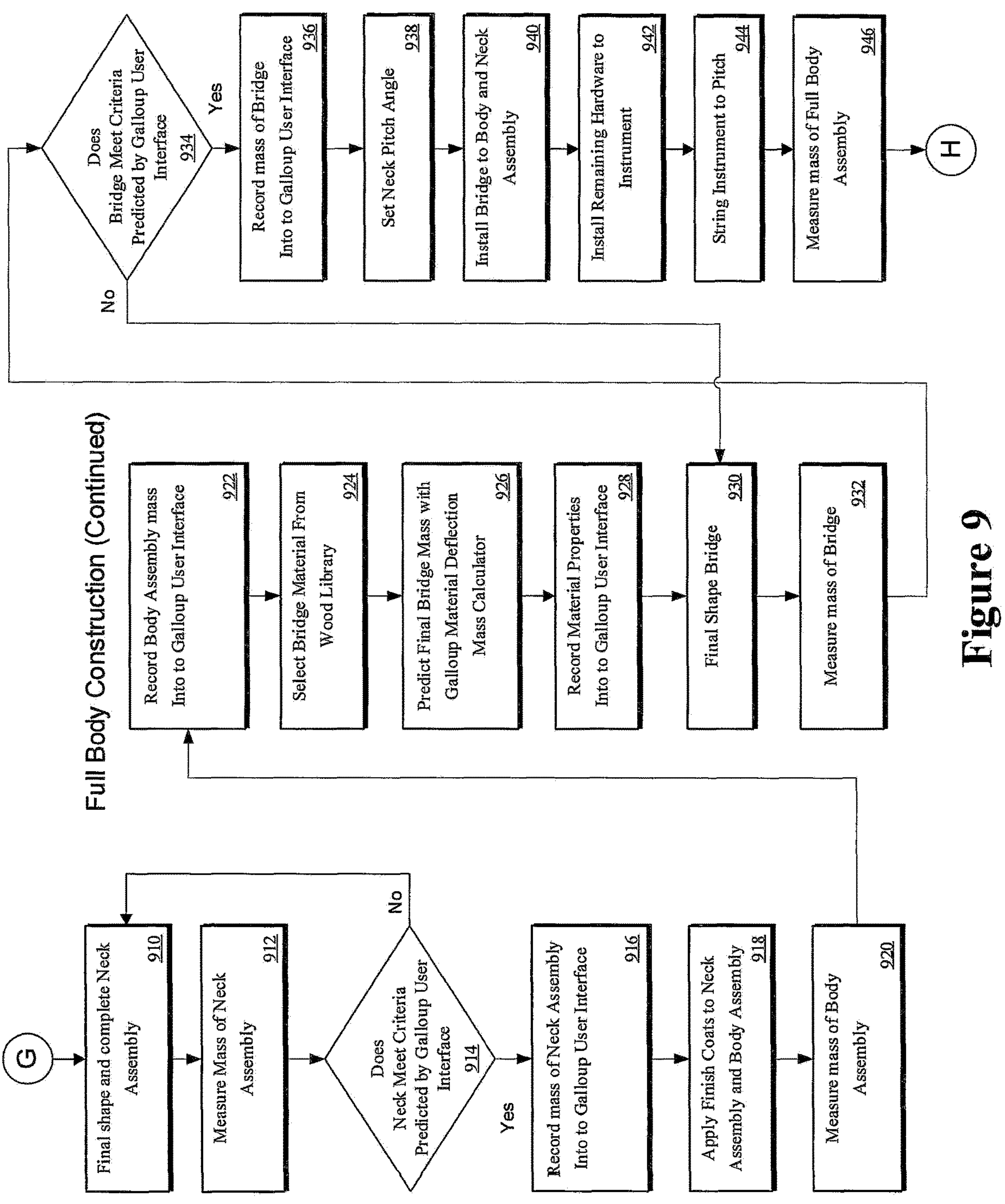
Figure 10:
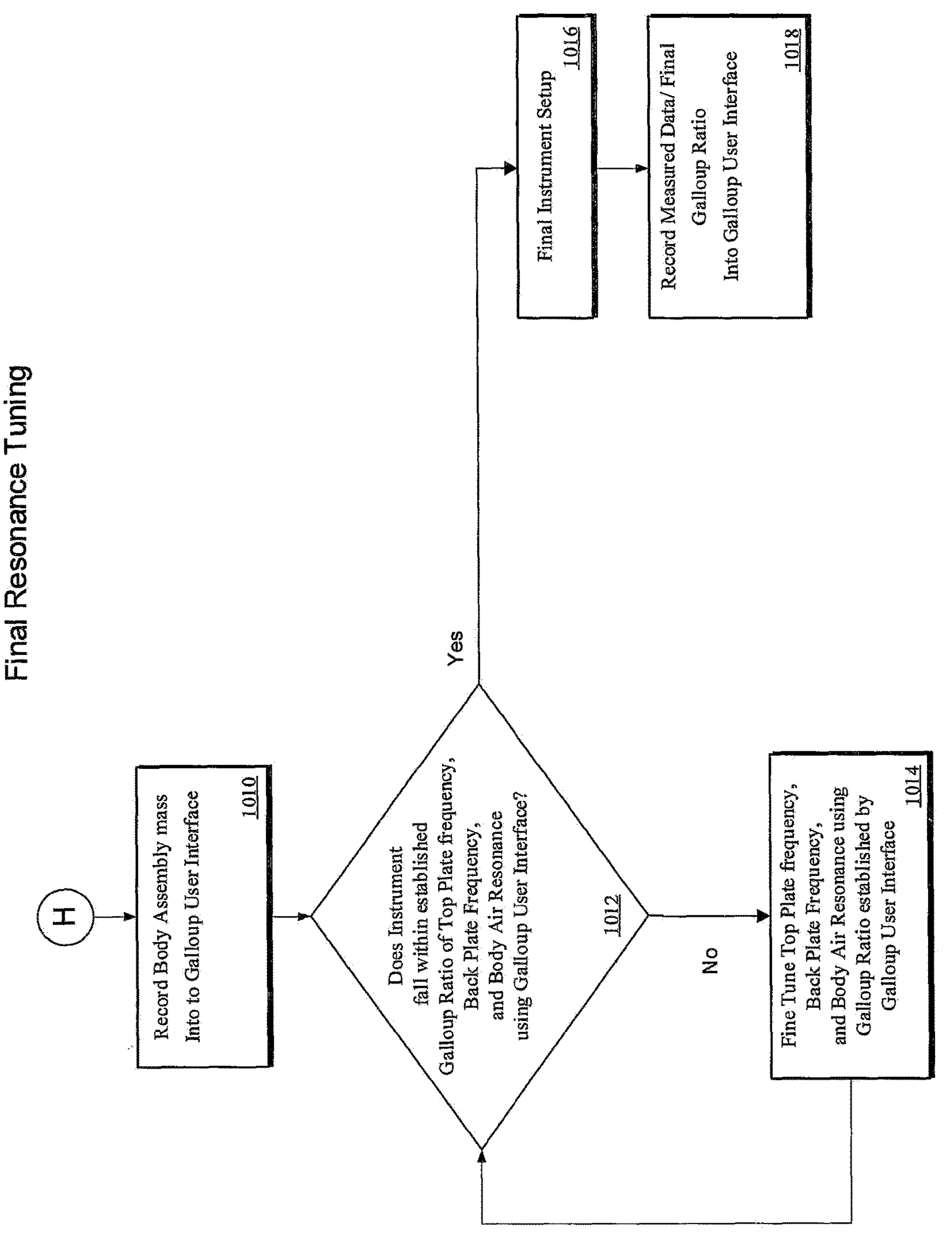

In the flowcharts presented in FIGS. 2-10, the steps of an example method for constructing a musical instrument are described. The method begins at step 210 in FIG. 2, and then, in step 214, it is determined if a current or new model of the instrument is to be used. If it is determined in step 214 that a new model of the instrument is to be used, then steps 218-234 of the new model definition process 236 are carried out before steps 310-317 in FIG. 3. Conversely, if it is determined in step 214 that a current model of the instrument is to be used, then the method proceeds to steps 310-317 in FIG. 3. After the completion of step 317 in FIG. 3, steps 318-326 of the top plate construction process 328 are performed. After the top plate construction steps have been performed, the method continues with steps 410-417 in FIG. 4. After the completion of step 417 in FIG. 4, steps 418-426 of the back plate construction process 428 are performed. Then, turning to FIG. 5, the method proceeds with steps 510-514. In step 514 of FIG. 5, it is determined if a solid side construction or an engineered side construction is to be used. If it is determined in step 514 that a solid side construction is to be used, then steps 518-522 of the solid side construction process 516 are carried out. Conversely, if it is determined in step 514 that an engineered side construction is to be used, then the method proceeds to steps 524-528 in FIG. 5. After which, steps 530-534 are carried out, and then the method continues with the top plate voicing steps 610-624 in FIG. 6. Then, following the top plate voicing steps 610-624 in FIG. 6, the back plate voicing steps 710-724 in FIG. 7 are performed. Next, after performing the back plate voicing steps 710-724, the full body construction steps 810-846 in FIG. 8 are carried out. The full body construction portion of the method continues with steps 910-946 in FIG. 9, and then the method concludes with the final resonance tuning steps 1010-1018 in FIG. 10.

Figure 11:
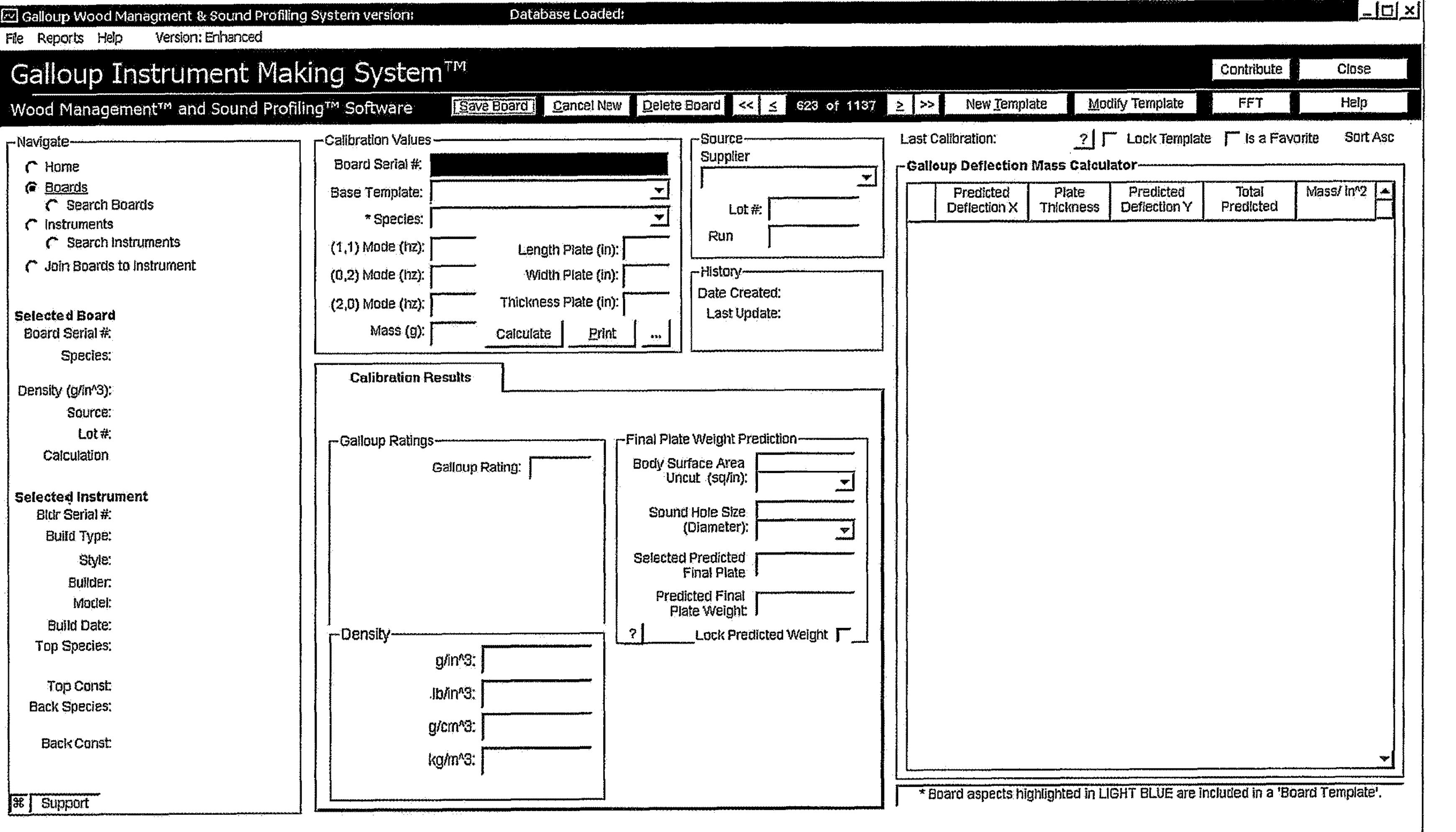
FIGS. 11-15 depict various screens presented by the graphical user interface ("GUI") of the example material selection system.

A first example screen 1100 presented by the graphical user interface ("GUI") 132 of the example material selection system 100 is shown in FIG. 11. This portion of the system software allows a user to enter the measured data and history of a new piece of wood. In turn, the system software determines the initial Galloup Rating, Density, Final Weight Prediction, and Predicted Deflection values in the Galloup Deflection Mass Calculator. Once saved, the board is now included in the library and can be searched/referenced in the future.

Figure 12:
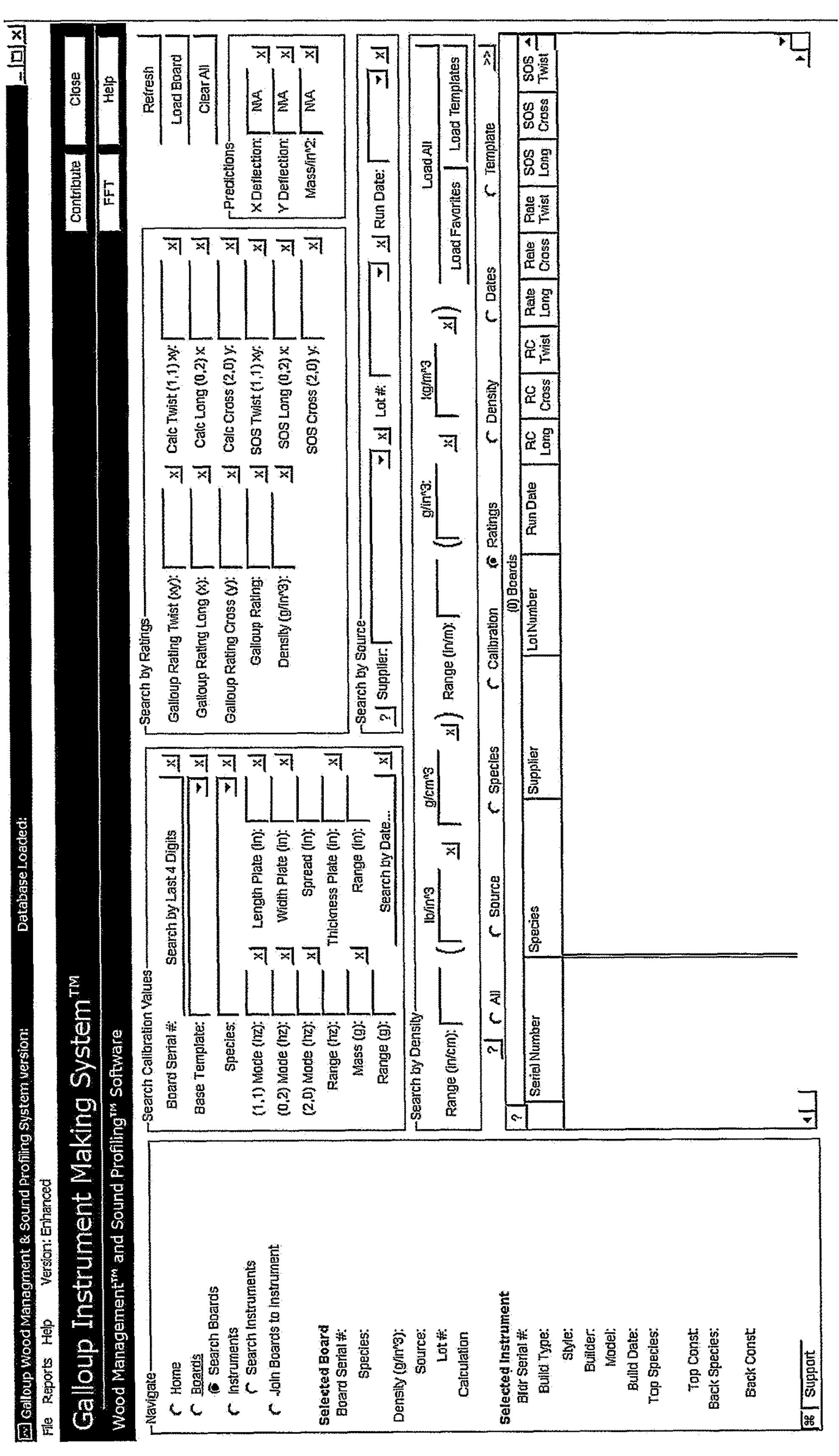

A second example screen 1200 presented by the graphical user interface ("GUI") 132 of the example material selection system 100 is shown in FIG. 12. This portion of the system software allows the user to search the "wood library" for a specific piece of wood based on the parameters entered. Parameters such as supplier, ratings, material properties, serial number, lot number, date, etc.

Figure 13:
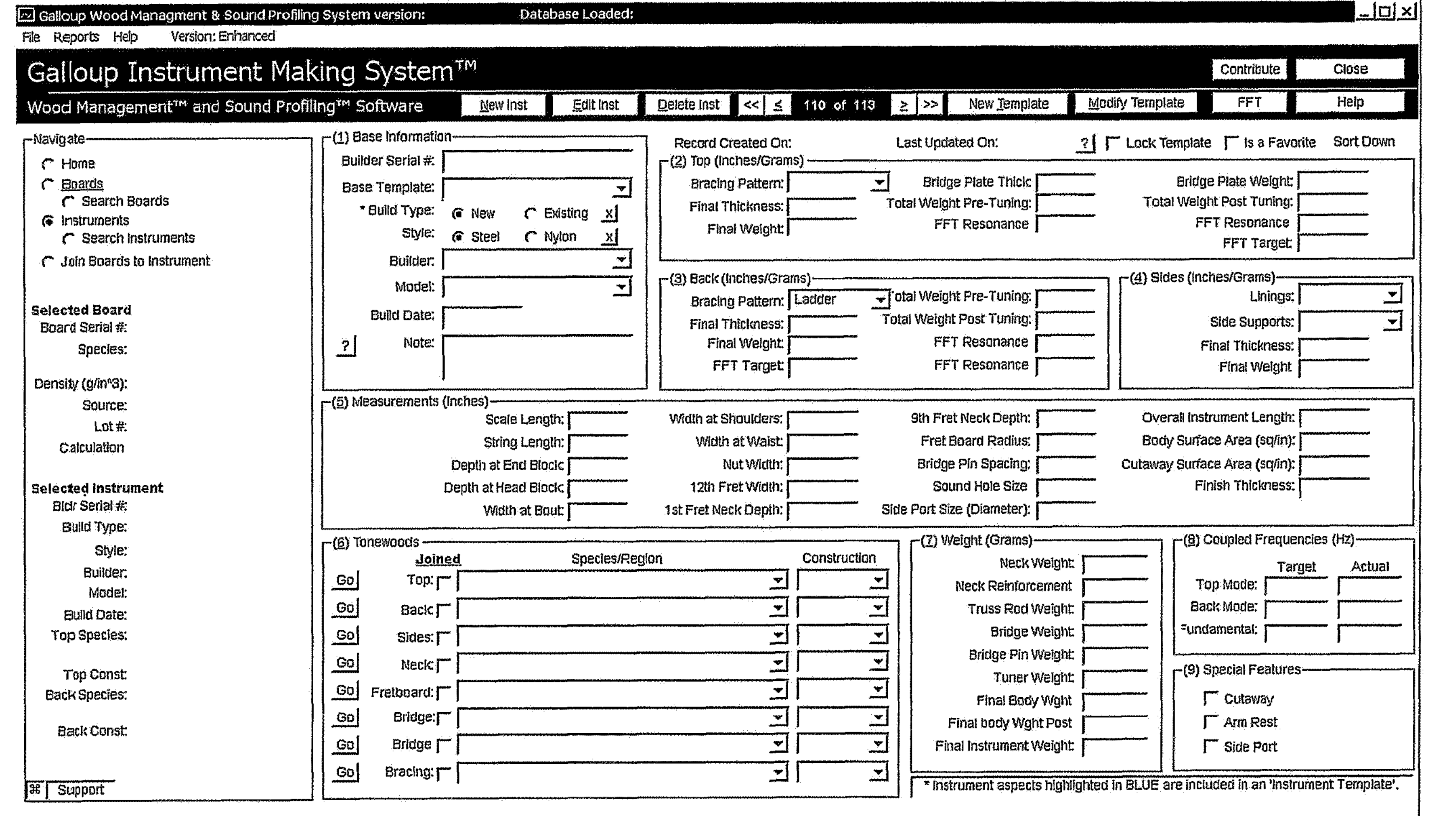

A third example screen 1300 presented by the graphical user interface ("GUI") 132 of the example material selection system 100 is shown in FIG. 13. This portion of the software allows the user to enter in all of the important data of an existing instrument or can be used as a template for a new instrument. Data includes size, shape, make, model, wood used, appointments, etc. Once the data is entered, it can be saved in the "instrument library" and can be accessed anytime as a reference for future builds.

Figure 14:
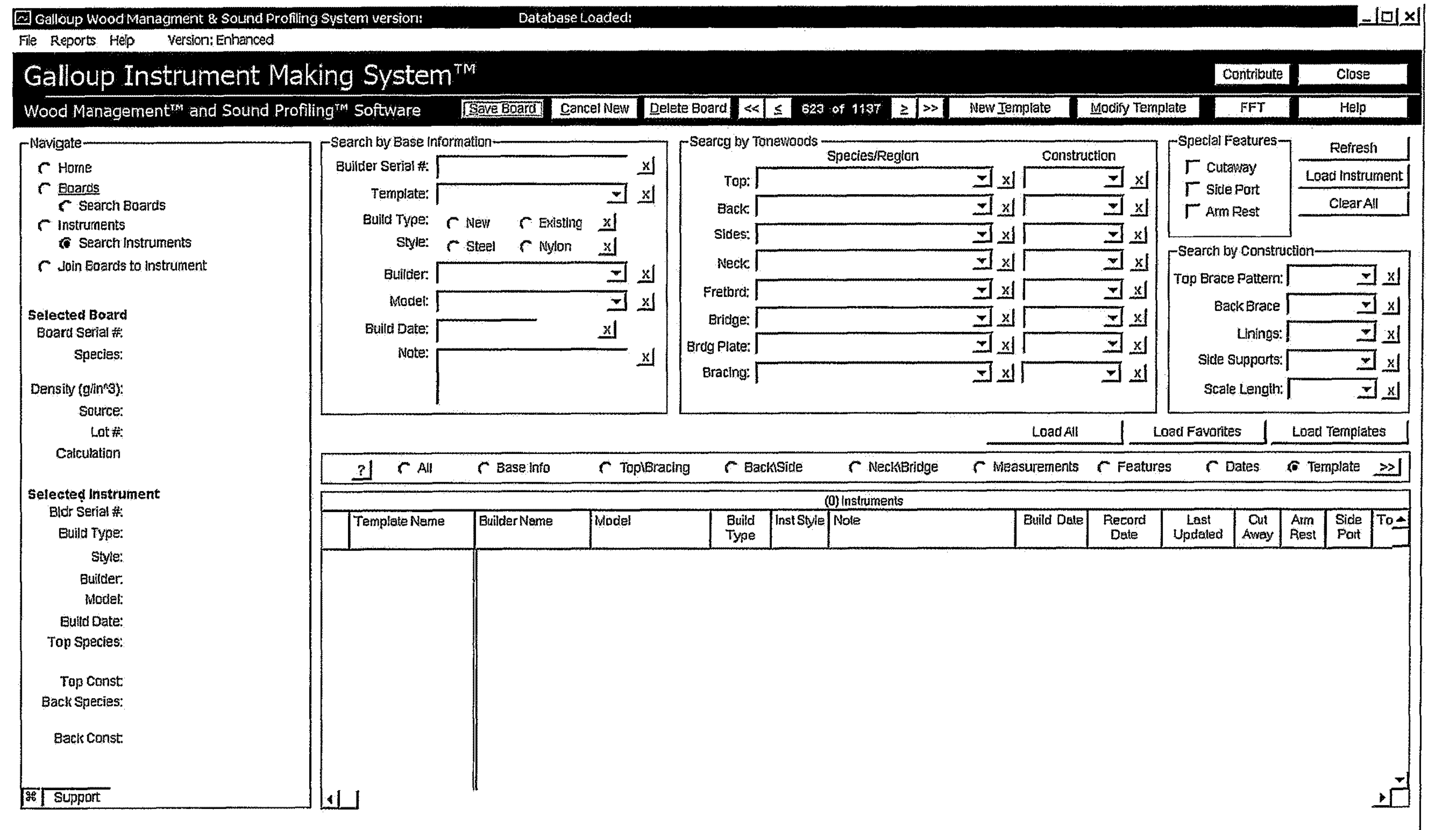

A fourth example screen 1400 presented by the graphical user interface ("GUI") 132 of the example material selection system 100 is shown in FIG. 14. This portion of the software allows the user to search the "instrument library" based on any of the information entered about the specific instrument(s) in mind.

Figure 15:
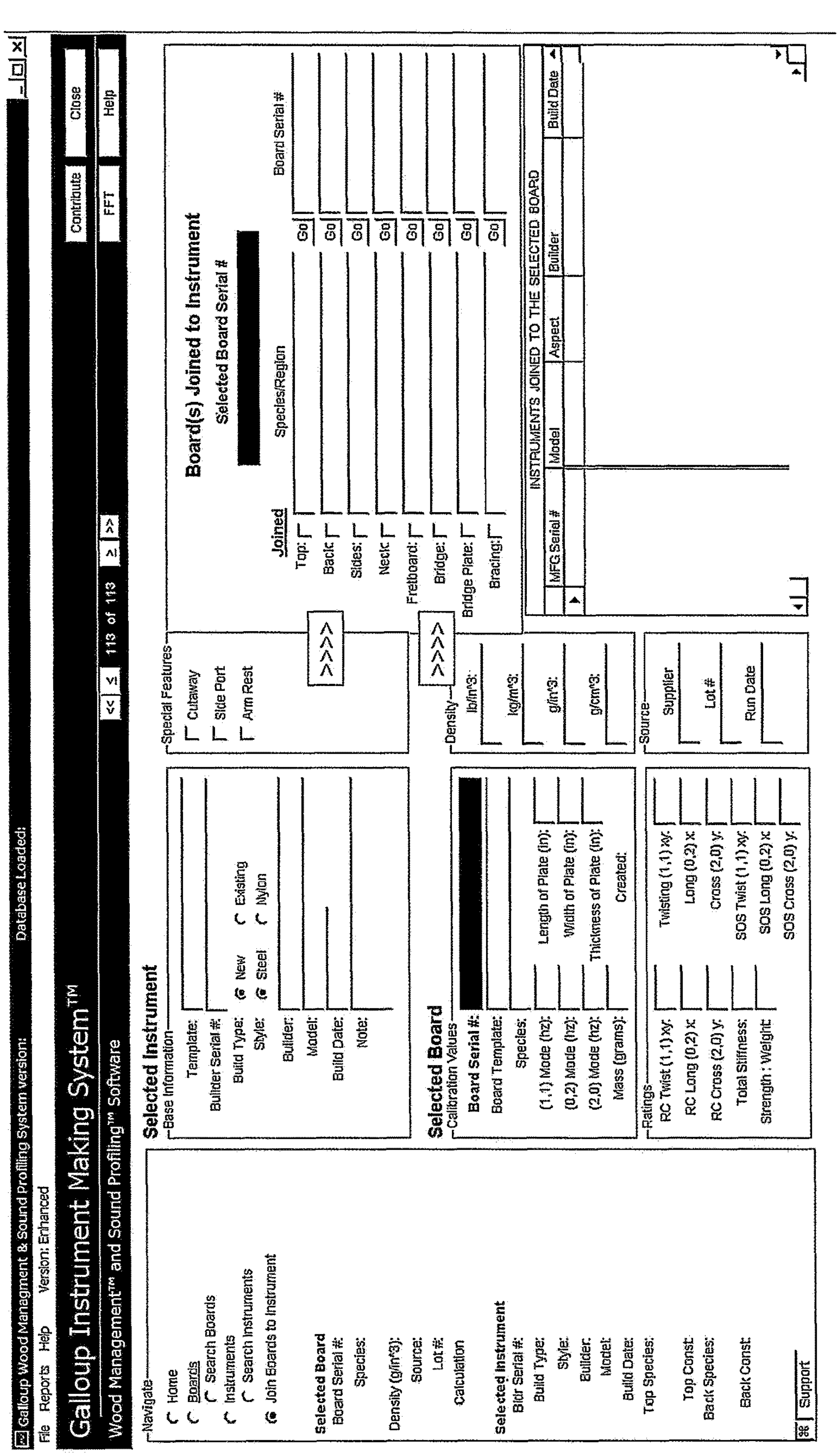

A fifth example screen 1500 presented by the graphical user interface ("GUI") 132 of the example material selection system 100 is shown in FIG. 15. This portion of the software allows the user to "join" or apply a piece of wood from the "wood library" to an instrument in the "instrument library". This ensures that, when a piece of wood is used in a build, it is categorized as such and the user knows it is no longer accessible for use on another instrument. It also allows the user to see what board(s) will work best for what instrument based on their preferences and system.

In one or more alternative embodiments, the material rating module 106, the rating database 120, and the material selection module 130 of the above-described system 100 may be incorporated in a single computer workstation or computing device.

Now, with reference to FIGS. 16-38, several embodiments of material testing assemblies will be described. As will be described hereinafter, each of the material testing assemblies includes an excitation device and a vibration receiver. The vibration receivers detect and receive vibrations generated by a material sample upon interaction with the excitation devices.

In one or more embodiments, the acoustic material testing assemblies described hereinafter with respect to FIGS. 16-38 may measure the fundamental resonant frequencies of wooden samples using two excitation techniques dependent on the physical geometry of the wooden sample. The material testing assemblies may use compressed air directed to the center of the sample for excitation. The material testing assemblies may utilize a frequency sweep excitation technique inputted at the nodal crossing of the long and cross grain resonant frequencies.

In one or more embodiments, the material testing assemblies utilize a driver to excite the material sample. The sample vibrates at greater magnitude when excited at a resonant frequency. The sample's resonant vibrations may be measured with a piezoelectric transducer. The outputted voltages from the transducer are inputted into a personal computer (PC) soundcard and spectral analysis software is used to deduce the resonant frequencies of the sample through Fast Fourier Transformation ("FFT"). These values are then used to calculate the material property values of interest.

In one or more embodiments, the receiving transducers of the material testing assemblies may be strategically placed at the nodes of a desired resonant frequency's modal shape. The assemblies support the sample with stand-offs contacting at nodal points unoccupied by sensors.

In one or more embodiments, the fundamental resonant frequency of the long grain bending mode of the wooden sample may be used to calculate the speed of sound (c) in the wooden sample. For example, the wooden sample may be in a form of a wooden dowel that measures 18 inches long (L) with a radius of 0.375 inches (a) or (0.4572 m×0.009252 m). The long grain bending resonant frequency, f, is typically around 400 Hz. This resonance is primarily determined by the geometry of the sample and average density. Variations in material properties result in a unique resonant frequency for each sample of the same geometry.

The speed of sound (c) may be computed as follows:

c=(f*(LA2))/(3.5607*K) where K=a/2

The coefficient, 3.5607, may be refined with further testing.

A first illustrative embodiment of a material testing assembly 1600 is depicted in the perspective views of FIGS. 16-21. The material testing assembly 1600 may be used for testing elongate objects, such as drum sticks.

Figure 16:
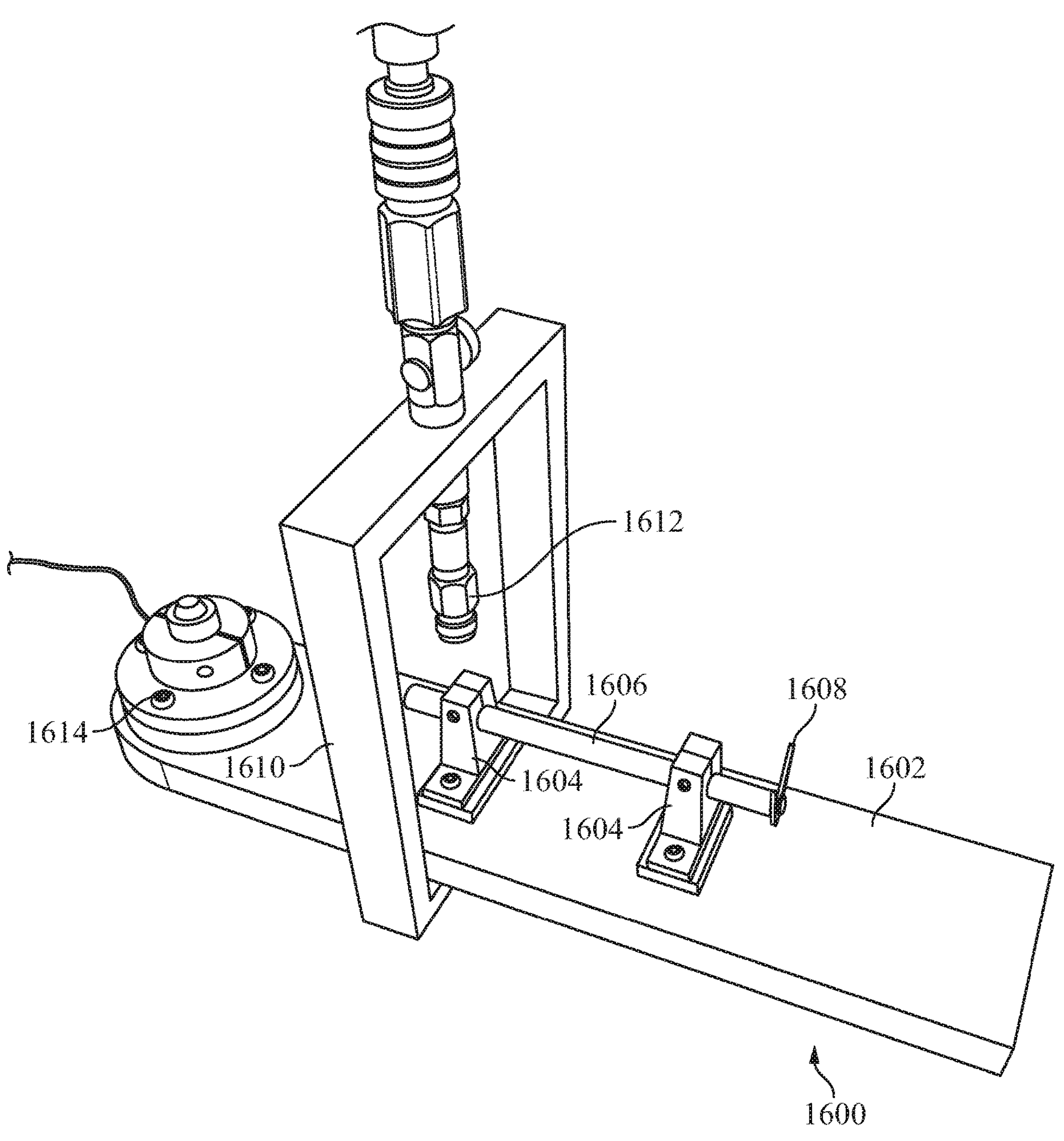
FIGS. 16-38 depict examples of material testing assemblies that include excitation devices and vibration receivers.
Figure 17:
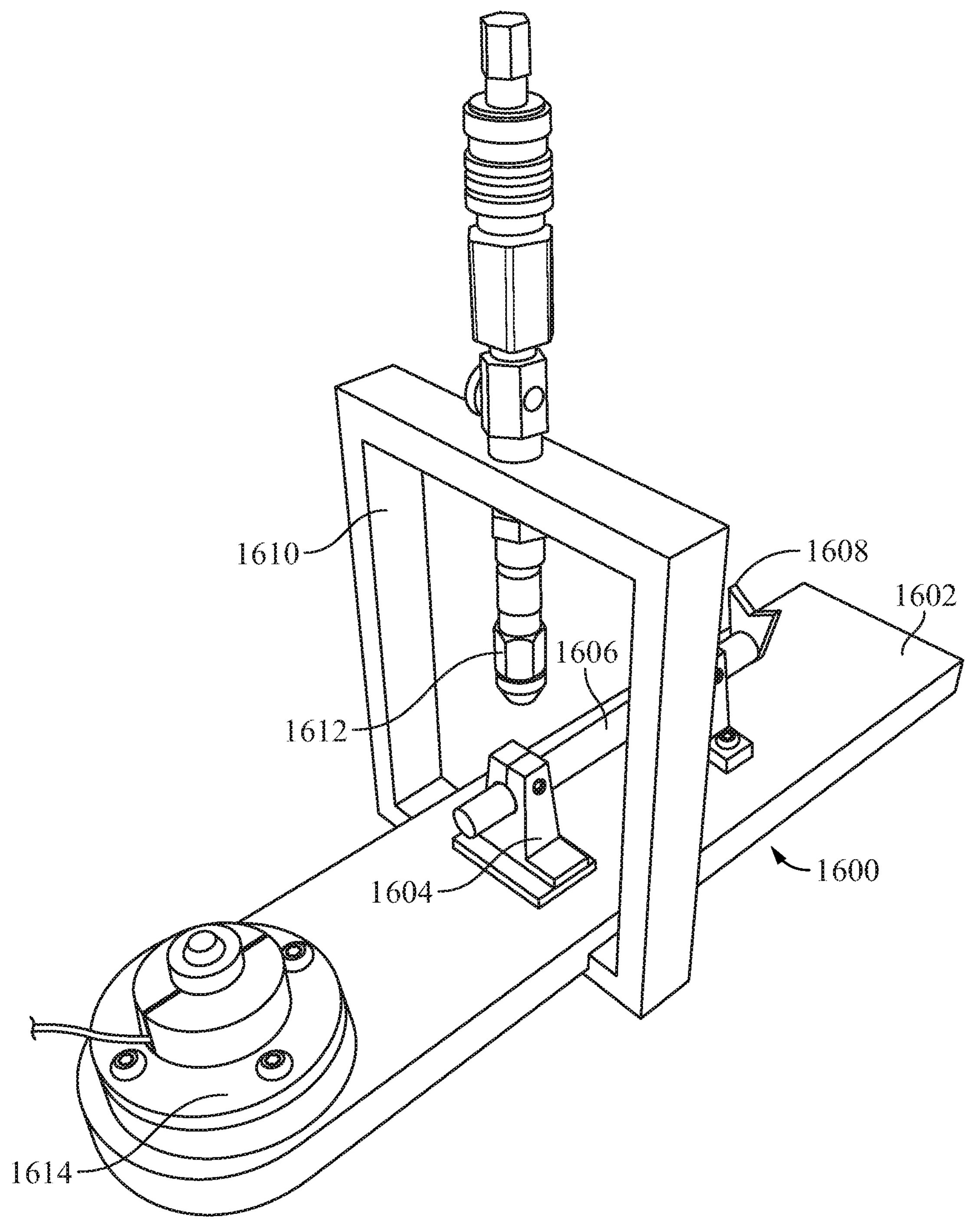
Figure 18:
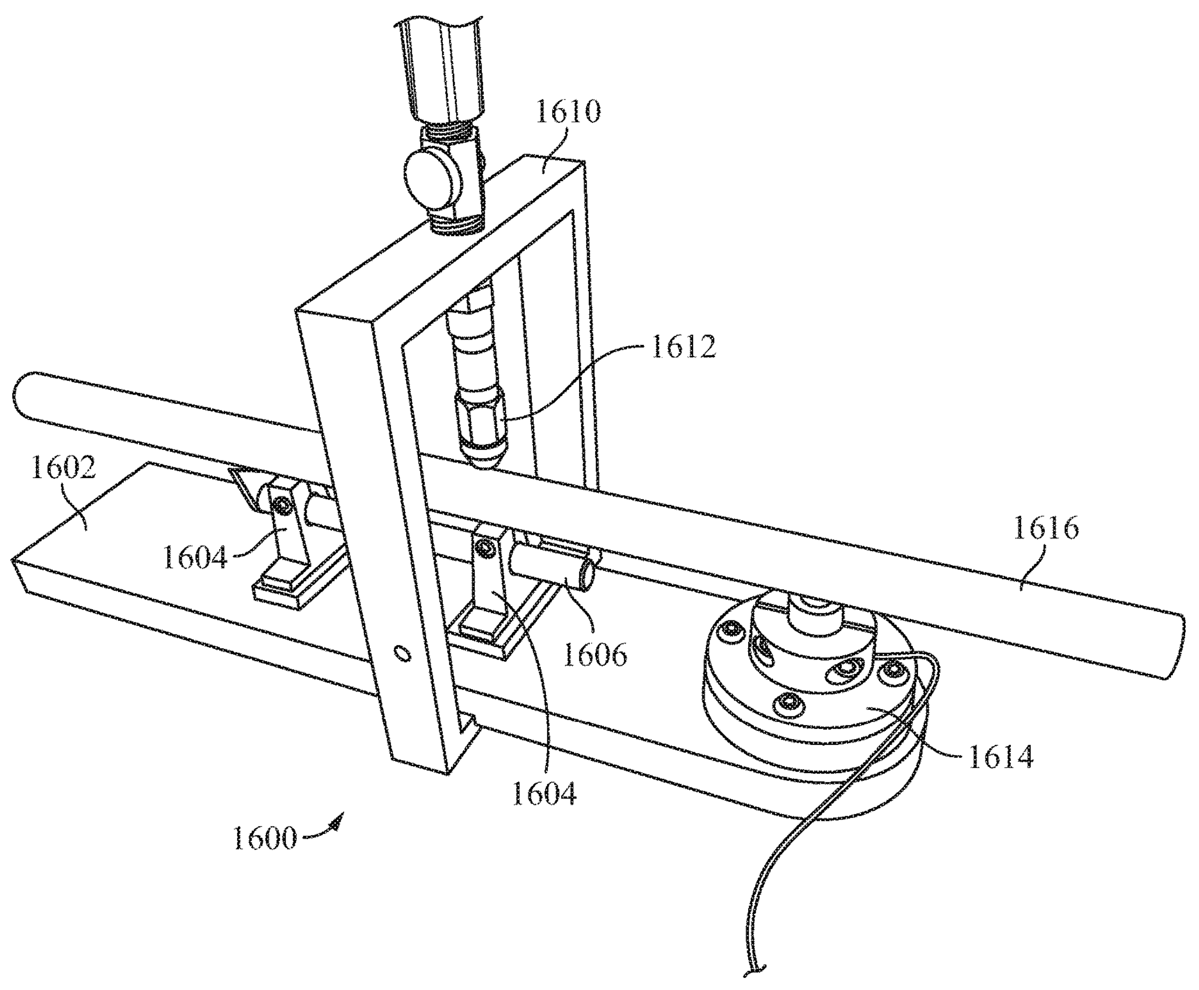
Figure 19:
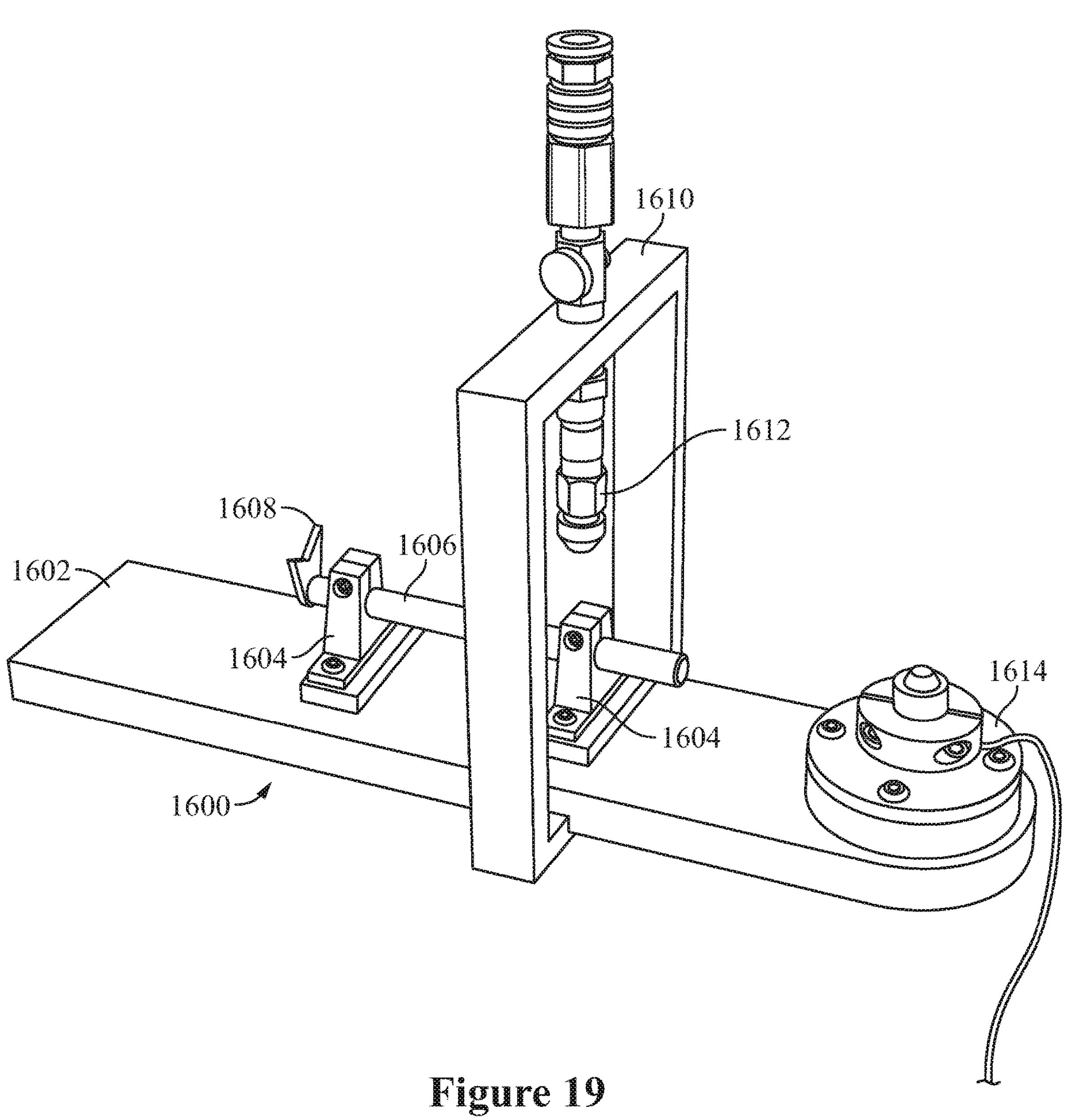

Referring initially to the perspective views of FIGS. 16 and 17, it can be seen that the material testing assembly 1600 comprises a support base 1602 with a plurality of support brackets 1604 mounted on the support base 1602. The support brackets 1604 support a slidable bar 1606 with a V-shaped end piece 1608 above the support base 1602. As shown in FIGS. 16 and 17, the material testing assembly 1600 further comprises an air nozzle 1612 (i.e., one type of excitation device) supported above the support base 1602 by means of a rectangular air nozzle support member 1610. The rectangular air nozzle support member 1610 is attached to the support base 1602. The air nozzle 1612 excites the material sample by discharging compressed air onto the material sample. In addition, referring again to FIGS. 16 and 17, the material testing assembly 1600 further comprises a transducer 1614 (i.e., one type of vibration receiver) mounted on the support base 1602 for measuring the vibrations of the material sample.

In one or more embodiments, the material testing assembly 1600 of FIGS. 16-21 provides a support cradle for testing elongate objects. The slidable bar 1606 with the V-shaped end piece 1608 is able to accommodate different lengths of elongate material samples (i.e., by sliding the bar 1606 relative to the support brackets 1604). Compressed air is used to excite the elongate material sample. The transducer 1614, which is a type of sensor pickup, measures the vibration of the material sample when excited by the compressed air, thereby allowing the frequencies of the material sample to be determined.

Figure 20:
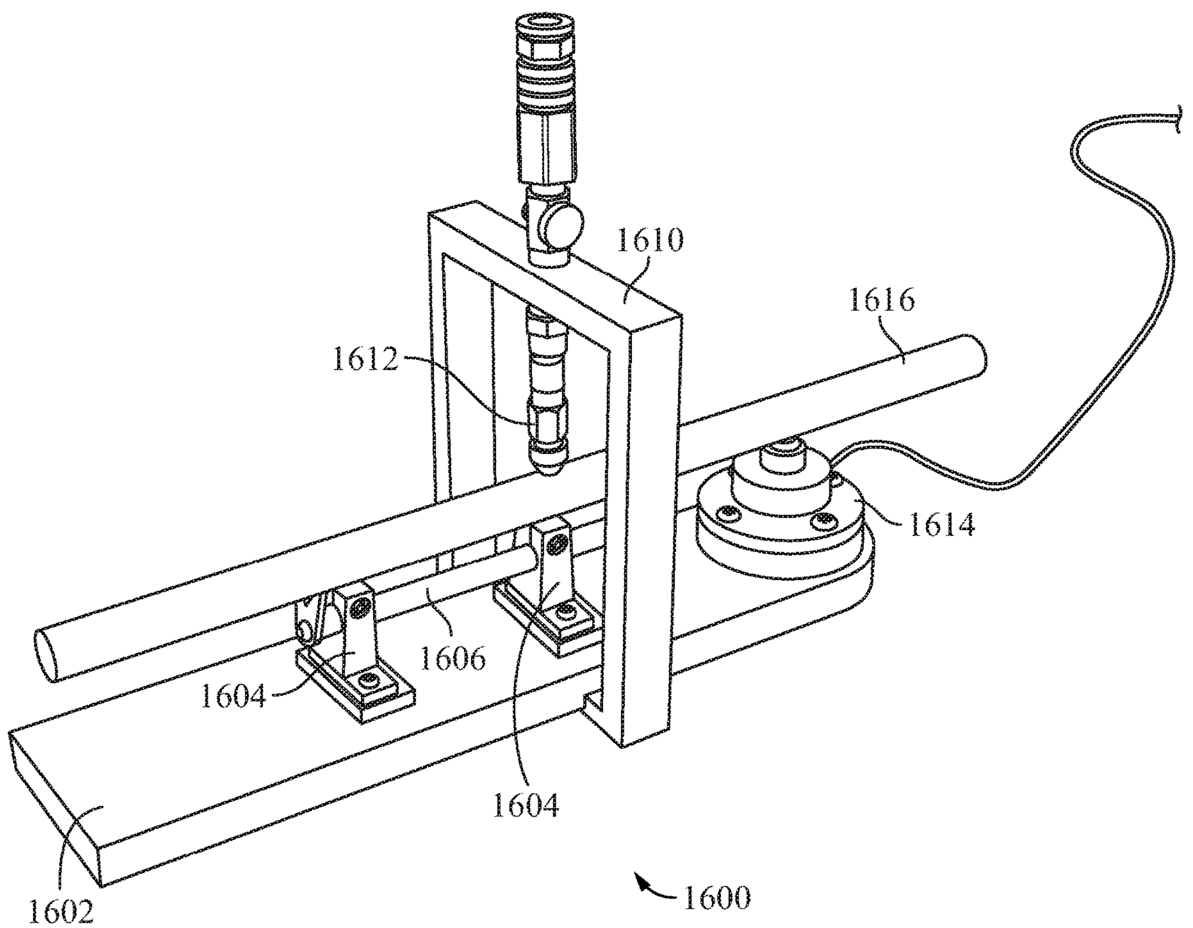
Figure 21:
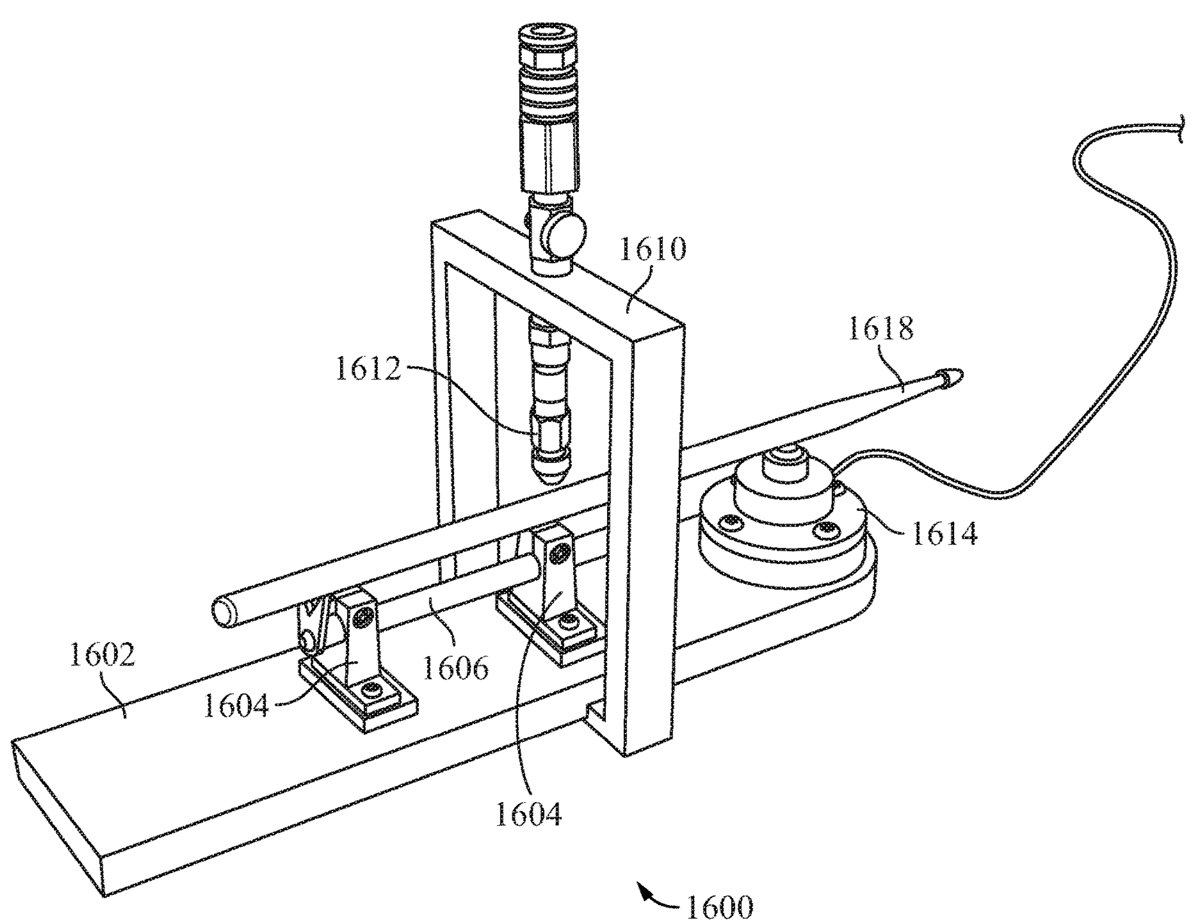

An exemplary material sample is depicted in FIGS. 18-21. A wooden dowel rod 1616, which is approximately 18 inches in length, is shown being disposed in the material testing assembly 1600. The material testing assembly 1600 is designed to be a real-time air tester for accommodating the various nodes of the wooden dowel rod 1616. In FIG. 20, the wooden dowel rod 1616 is shown from a different perspective. In FIG. 21, an exemplary finished product, namely a drum stick 1618, that has been formed from the wooden dowel rod 1616 is illustrated.

Figure 22:
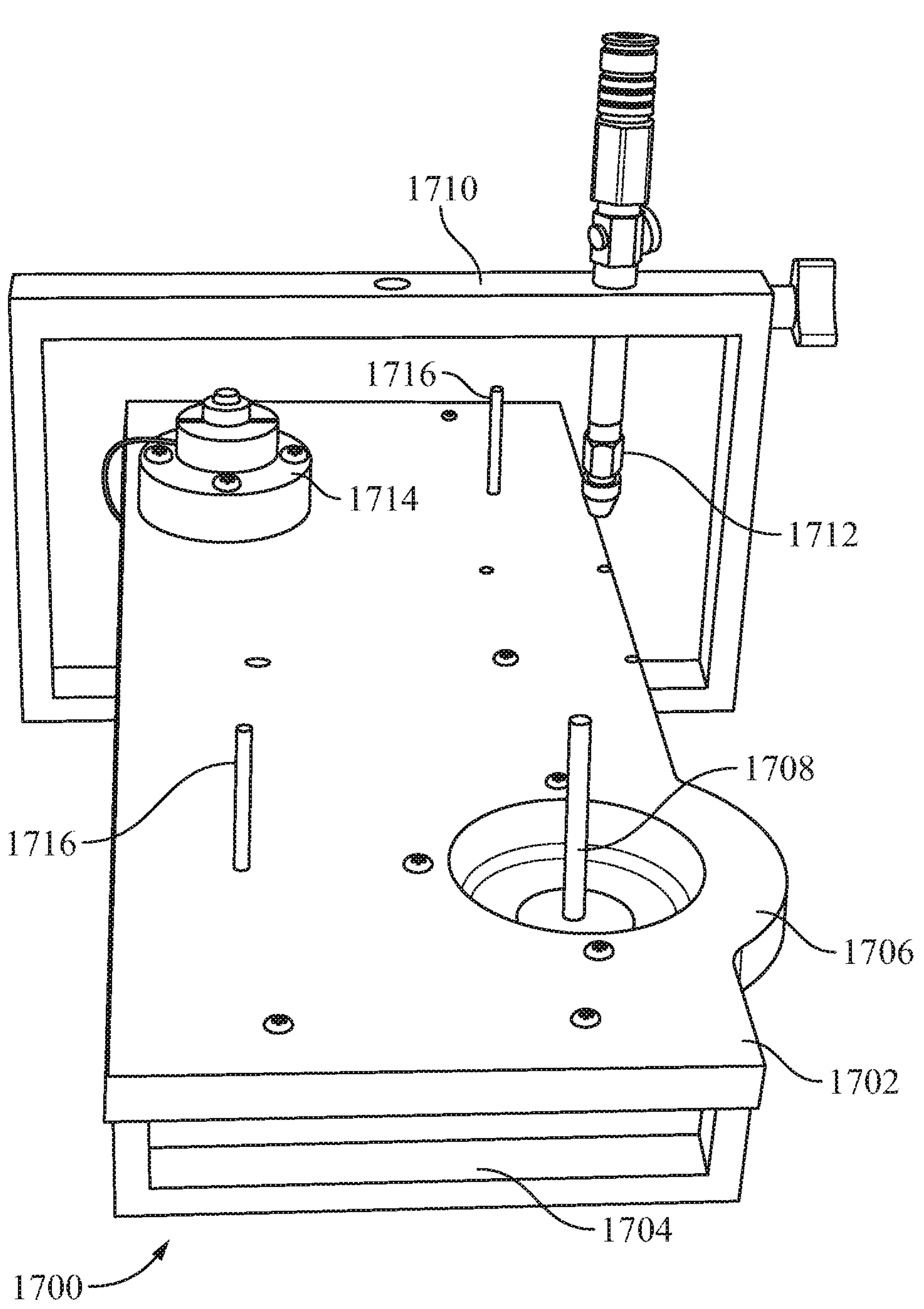
Figure 23:
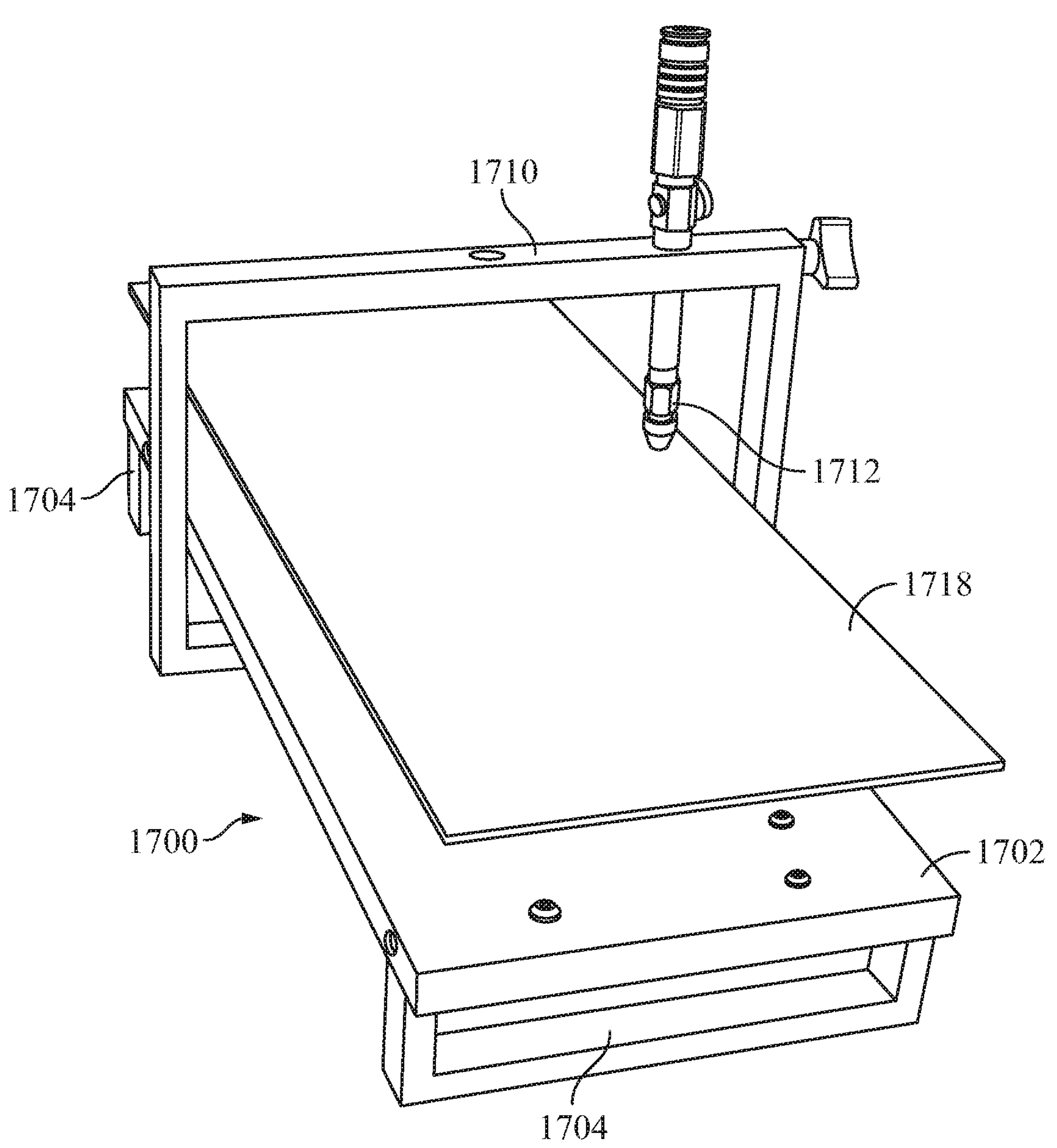

A second illustrative embodiment of a material testing assembly 1700 is depicted in the perspective views of FIGS. 22 and 23. The material testing assembly 1700 may be used for testing flat, sheet-like objects, such as sheets of wood used for making guitars.

Referring initially to the perspective views of FIGS. 22 and 23, it can be seen that the material testing assembly 1700 comprises a support base 1702 with a plurality of base support legs 1704 disposed underneath the support base 1702. The support base 1702 also includes a plurality of support pins 1716 mounted on the support base 1702 for supporting a material sample above the top surface of the support base 1702. As shown in FIGS. 22 and 23, the material testing assembly 1700 further comprises an air nozzle 1712 (i.e., one type of excitation device) supported above the support base 1702 by means of a rectangular air nozzle support member 1710. The rectangular air nozzle support member 1710 is attached to the underside of the support base 1702. The air nozzle 1712 excites the material sample by discharging compressed air onto the material sample. In addition, referring again to FIG. 22, the material testing assembly 1700 further comprises a sonic driver 1706 (e.g., a speaker) mounted in the support base 1702 for serving as an additional excitation device for the material sample. As shown in FIG. 22, a threaded rod or pin 1708 extends upwardly from the sonic driver 1706 for contacting, and exciting the material sample. Also, with reference again to FIG. 22, the material testing assembly 1700 further comprises a transducer 1714 (i.e., one type of vibration receiver) mounted on the support base 1702 for measuring the vibrations of the material sample.

In one or more embodiments, the material testing assembly 1700 of FIGS. 22 and 23 is used for testing raw, flat stock (e.g., guitar body portions). The transducer 1714 and the air supply nozzle 1712 are generally the same as the transducer 1614 and the air supply nozzle 1612 of the first illustrative embodiment. However, an additional excitation device in the form of the sonic driver 1706 is provided in the material testing assembly 1700. The sonic driver 1706 (e.g., a speaker) moves up and down to vibrate the material sample. The two excitation devices 1706, 1712 can be done independently (i.e., air supply 1712 and sonic driver 1706). The threaded rod 1708 allows the sonic driver 1706 (e.g., the speaker) to be adjusted up and down over a sweep from 20 Hertz up to 250 Hertz. The sonic driver 1706 (e.g., the speaker) moves the rod 1708 up and down to excite the material sample. The two pins 1716 are used to balance the material sample on the support base 1702.

An exemplary material sample is depicted in FIG. 23. A sheet of wood 1718 is shown being disposed in the material testing assembly 1700. The material testing assembly 1700 is designed to be a combination sonic sweep and air tester for testing sheet-like material samples (e.g., for testing sheet of wood 1718). In FIG. 23, the sheet of wood 1718 is supported on the two support pins 1716, the transducer 1714, and the threaded rod 1708 of the sonic driver 1706.

Figure 24:
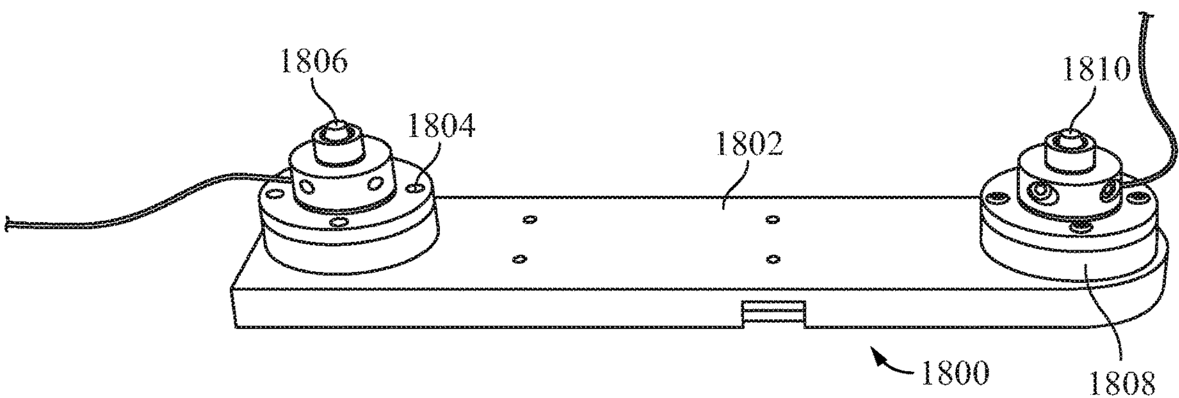
Figure 25:
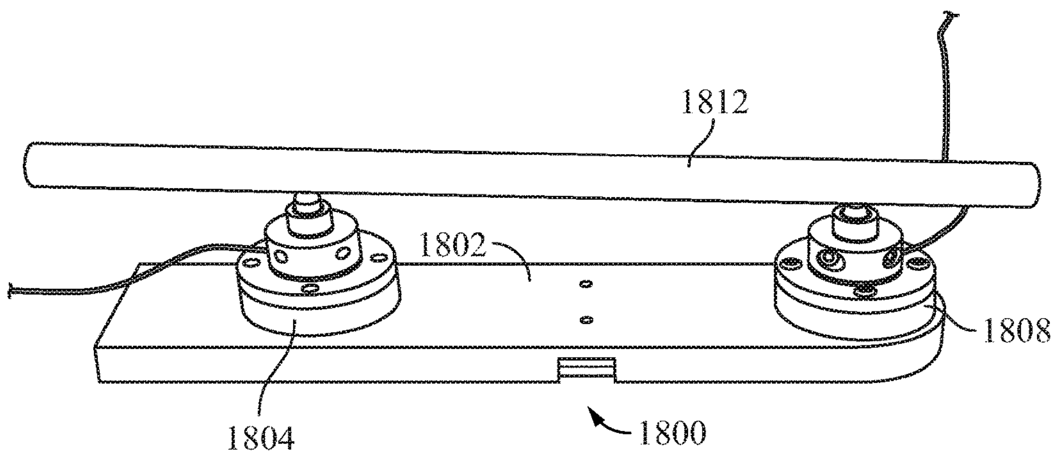
Figure 26:
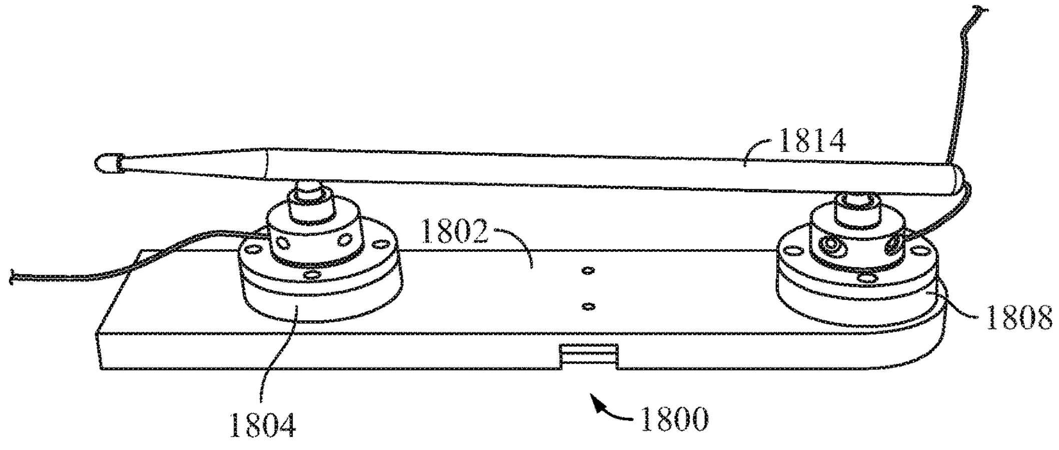

A third illustrative embodiment of a material testing assembly 1800 is depicted in the perspective views of FIGS. 24-26. The material testing assembly 1800 may be used for testing elongate objects, such as drum sticks.

Referring initially to the perspective view of FIG. 24, it can be seen that the material testing assembly 1800 comprises a support base 1802 with a sonic driver 1804 (e.g., a speaker) mounted at one end of the support base 1802 and a transducer 1808 mounted at the other, opposite end of the support base 1802. The sonic driver 1804 excites the material sample, while the transducer 1808 measures the vibrations of the material sample. As shown in FIG. 24, the sonic driver 1804 may be provided with a semi-circular recess 1806 formed therein for receiving a first cross-sectional portion of the material sample, while the transducer 1808 may be provided with a semi-circular recess 1810 formed therein for receiving a second cross-sectional portion of the material sample.

An exemplary material sample is depicted in FIGS. 25 and 26. In FIG. 25, a wooden dowel rod 1812 is shown being disposed in the material testing assembly 1800. The material testing assembly 1800 is designed to be a sonic sweep tester for accommodating the various nodes of the wooden dowel rod 1812. In FIG. 26, an exemplary finished product, namely a drum stick 1814 that has been formed from the wooden dowel rod 1812 is illustrated. As such, FIGS. 25 and 26 illustrate testing the raw stock and the final product, respectively. Transducer pickups can be used to measure vibrations of an object, or drive vibrations of an object. For example, the sonic driver 1804 and the transducer 1808 in FIGS. 24-26 may be the same hardware device, but used differently as an excitation device and a vibration receiver, respectively. In FIG. 26, the sonic driver 1804 drives the drum stick 1814, and transducer 1808 pickups up the vibrations of the drum stick 1814.

Figure 27:
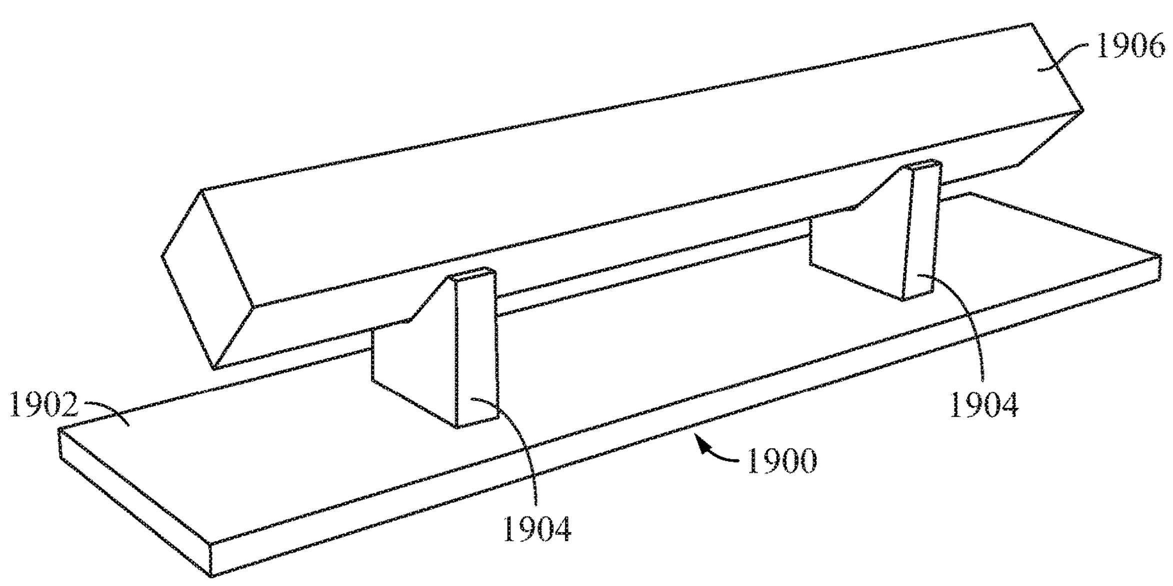
Figure 28:
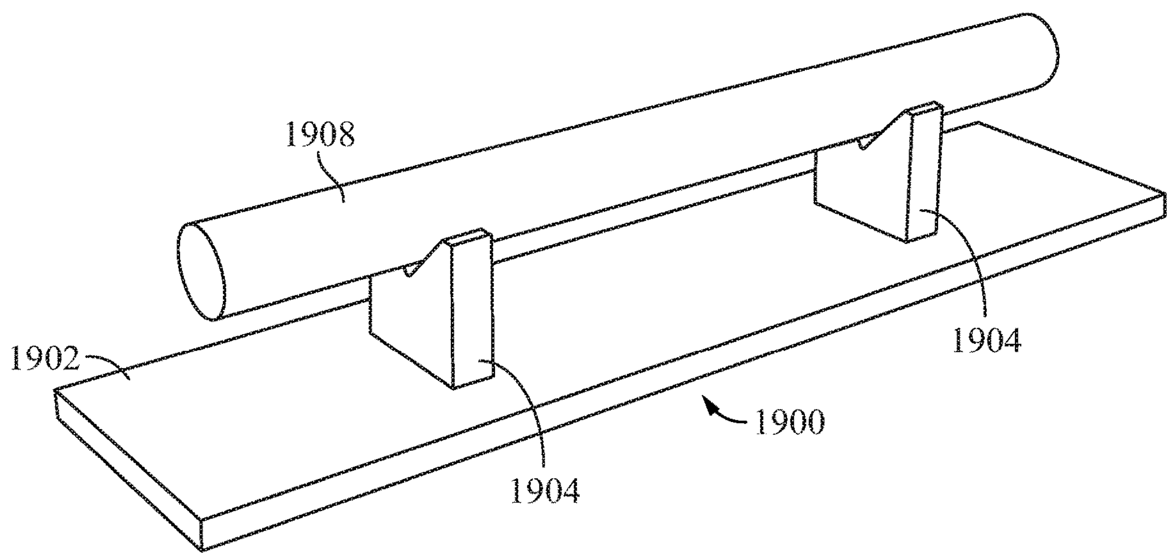
Figure 29:
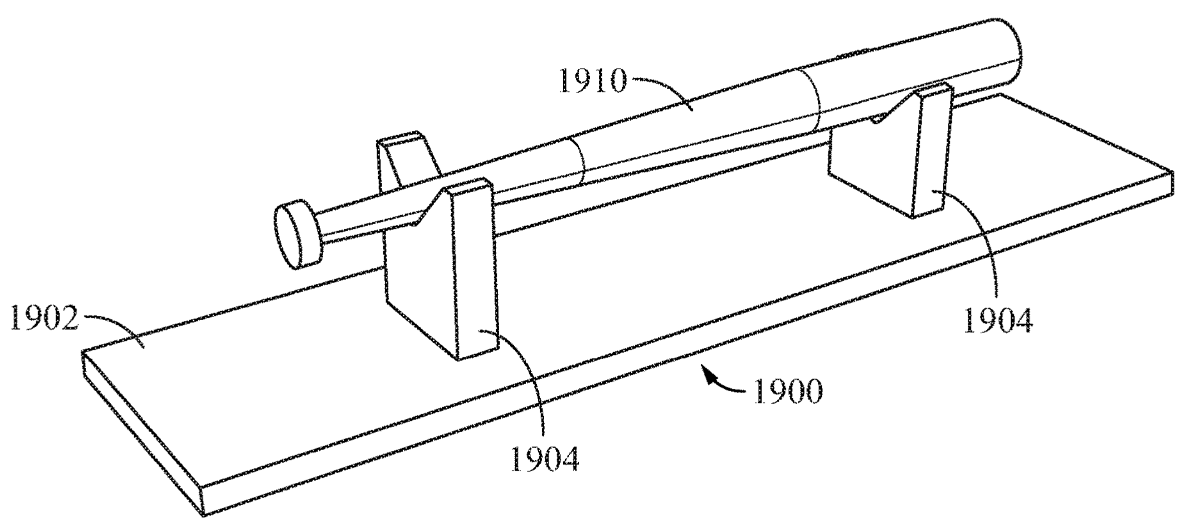

A first alternative embodiment of a material support cradle 1900 is depicted in the perspective views of FIGS. 27-29. The material support cradle 1900 may be used for testing elongate objects, such as baseball bats and the raw stock used to form baseball bats.

Referring initially to the perspective view of FIG. 27, it can be seen that the material support cradle 1900 comprises a support base 1902 with a plurality of upright members 1904 mounted on the support base 1902. The upright members 1904 each have a V-shaped notch formed in the top thereof for supporting a material sample above the support base 1902. While not explicitly shown in FIGS. 27-29, the material support cradle 1900 also may be provided with an excitation device (e.g., a compressed air nozzle and/or sonic driver) at one end for exciting a material sample and a vibration receiver (e.g., a transducer) at the other end for measuring vibrations of the material sample being excited by the excitation device. As such, the material support cradle 1900 would be provided as part of a material testing assembly, similar to the material testing assemblies 1600, 1700, 1800 described above.

Exemplary material samples are depicted in FIGS. 27-29. In FIG. 27, a square wood stock 1906 is shown being disposed in the material support cradle 1900. In FIG. 28, a round wood stock 1908 is shown being disposed in the material support cradle 1900. In FIG. 29, an exemplary finished product, namely a baseball bat 1910 that has been formed from the square wood stock 1906 and/or the round wood stock 1908 is illustrated in the material support cradle 1900. As such, the material support cradle 1900 can accommodate raw stock (e.g., dowel or square) or a finished product. For example, the processing of forming the baseball bat 1910 may comprise starting with the square wood stock 1906, then forming the square wood stock 1906 into round wood stock 1908, and finally forming the round wood stock 1908 into the final baseball bat 1910.

A second alternative embodiment of a material support cradle 2000 is depicted in the perspective and side views of FIGS. 30-33. The material support cradle 2000 may be used for testing elongate objects, such as drum sticks and the raw stock used to form drum sticks.

Figure 30:
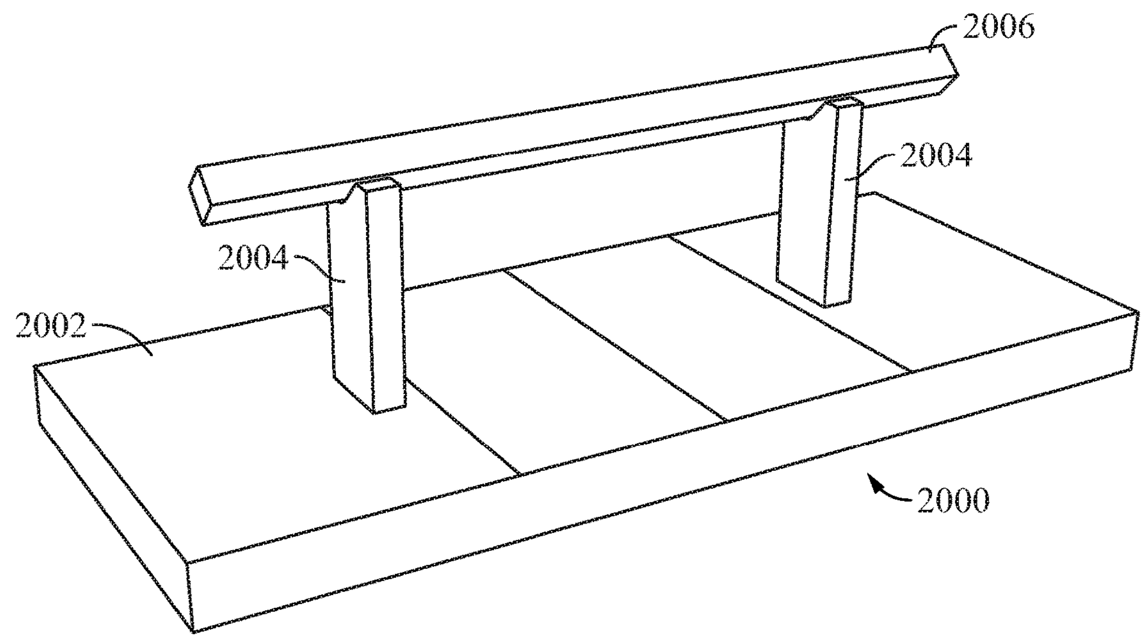

Referring initially to the perspective view of FIG. 30, it can be seen that the material support cradle 2000 comprises a support base 2002 with a plurality of upright members 2004 mounted on the support base 2002. The upright members 2004 each have a V-shaped notch formed in the top thereof for supporting a material sample above the support base 2002. While not explicitly shown in FIGS. 30-33, the material support cradle 2000 also may be provided with an excitation device (e.g., a compressed air nozzle and/or sonic driver) at one end for exciting a material sample and a vibration receiver (e.g., a transducer) at the other end for measuring vibrations of the material sample being excited by the excitation device. As such, the material support cradle 2000 would be provided as part of a material testing assembly, similar to the material testing assemblies 1600, 1700, 1800 described above. The material support cradle 2000 is similar to the material support cradle 1900, except that the upright members 2004 are taller than the upright members 1904.

Figure 31:
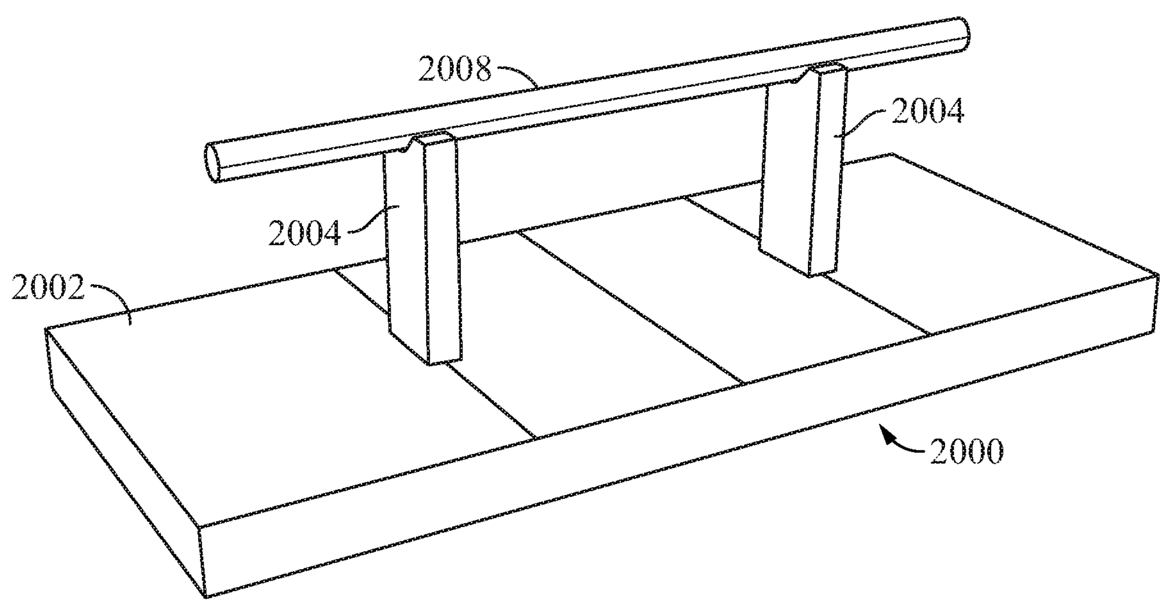
Figure 32:
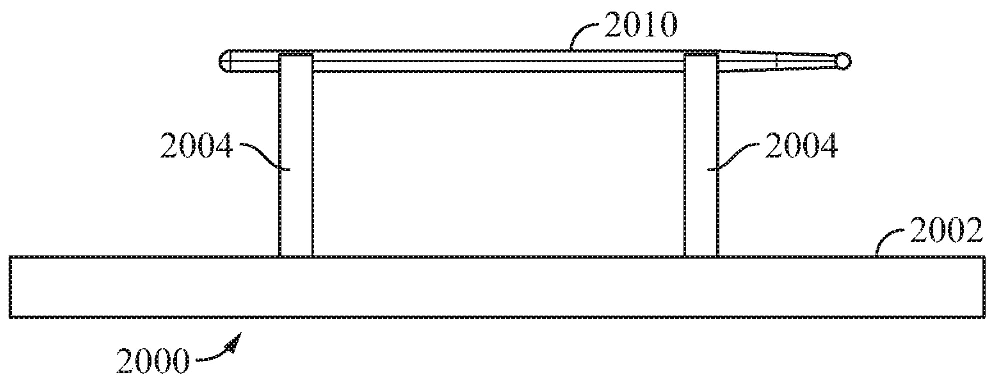
Figure 33:
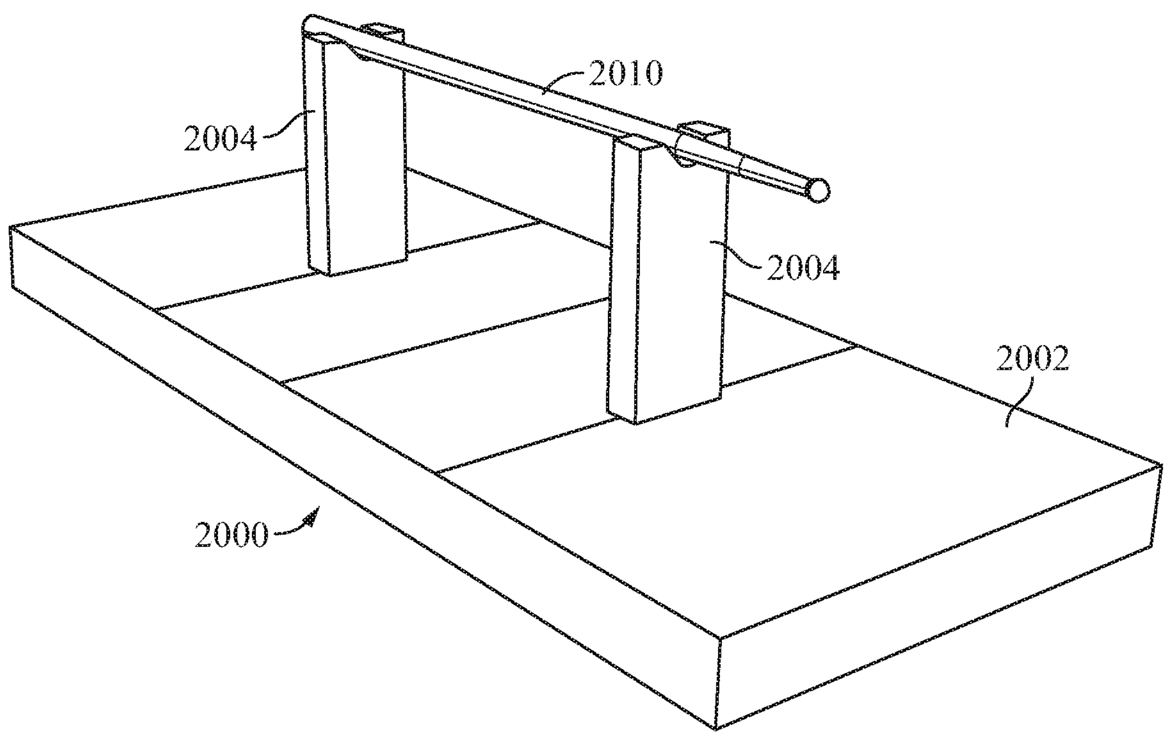

Exemplary material samples are depicted in FIGS. 30-33. In FIG. 30, a square wood stock 2006 is shown being disposed in the material support cradle 2000. In FIG. 31, a round wood stock 2008 is shown being disposed in the material support cradle 2000. In FIGS. 32 and 33, an exemplary finished product, namely a drum stick 2010 that has been formed from the square wood stock 2006 and/or the round wood stock 2008 is illustrated in the material support cradle 2000. As such, the material support cradle 2000 can accommodate raw stock (e.g., dowel or square) or a finished product. For example, the processing of forming the drum stick 2010 may comprise starting with the square wood stock 2006, then forming the square wood stock 2006 into round wood stock 2008, and finally forming the round wood stock 2008 into the final drum stick 2010.

Figure 34:
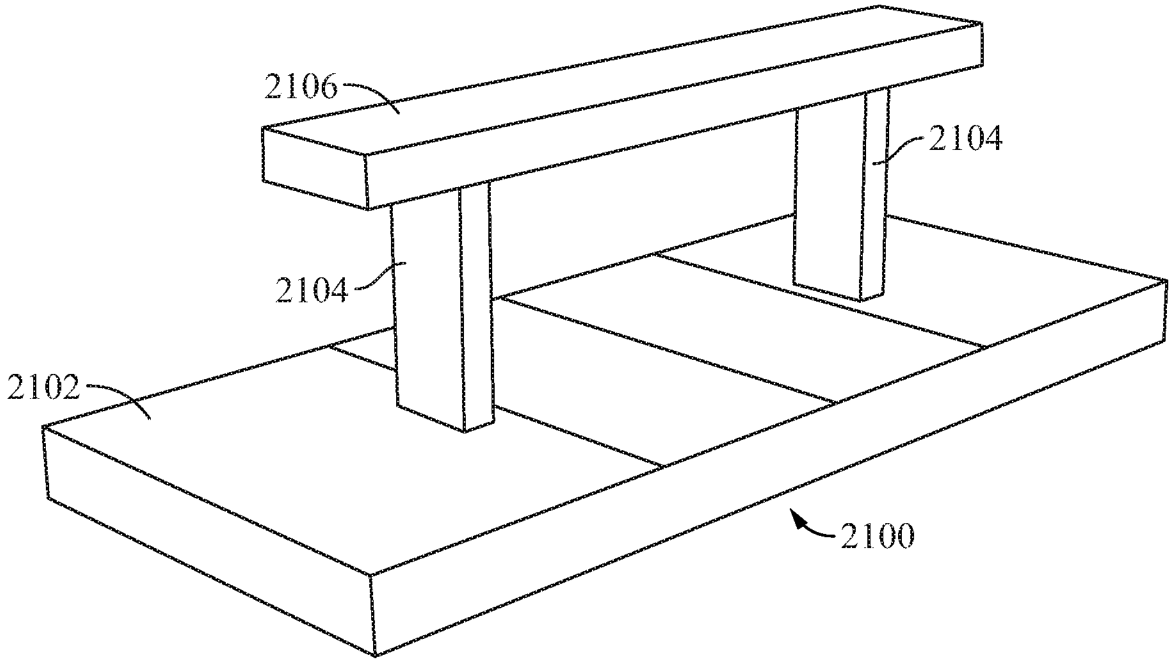

A third alternative embodiment of a material support cradle 2100 is depicted in the perspective view of FIG. 34. The material support cradle 2100 may be used for testing flat stock, such as wood stock having a 2 inch by 4 inch cross section (i.e., a 2"×4" piece of wood).

Referring to the perspective view of FIG. 34, it can be seen that the material support cradle 2100 comprises a support base 2102 with a plurality of upright members 2104 mounted on the support base 2102 for supporting a material sample 2106 above the support base 2102. While not explicitly shown in FIG. 34, the material support cradle 2100 also may be provided with an excitation device (e.g., a sonic driver) in one upright member 2104 for exciting a material sample and a vibration receiver (e.g., a transducer) in the other upright member 2104 for measuring vibrations of the material sample being excited by the excitation device. As such, the material support cradle 2100 would be provided as part of a material testing assembly, similar to the material testing assemblies 1600, 1700, 1800 described above.

A fourth illustrative embodiment of a material testing assembly 2200 is depicted in the perspective and side views of FIGS. 35-38. The vertical-style material testing assembly 2200 may be used for testing elongate objects, such as drum sticks.

Figure 35:
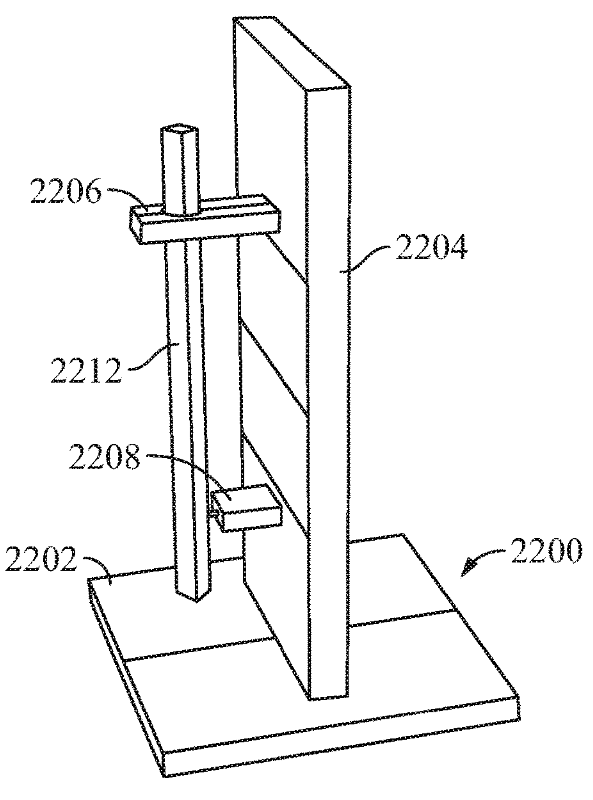
Figure 36:
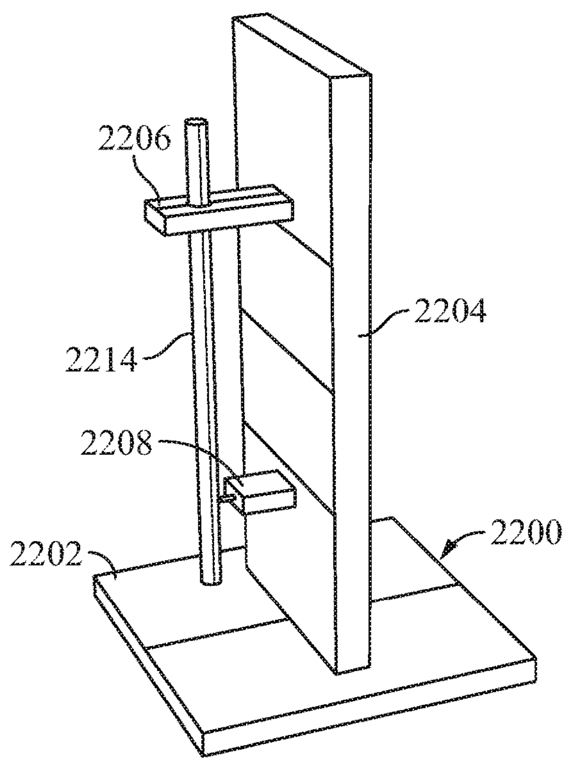
Figure 37:
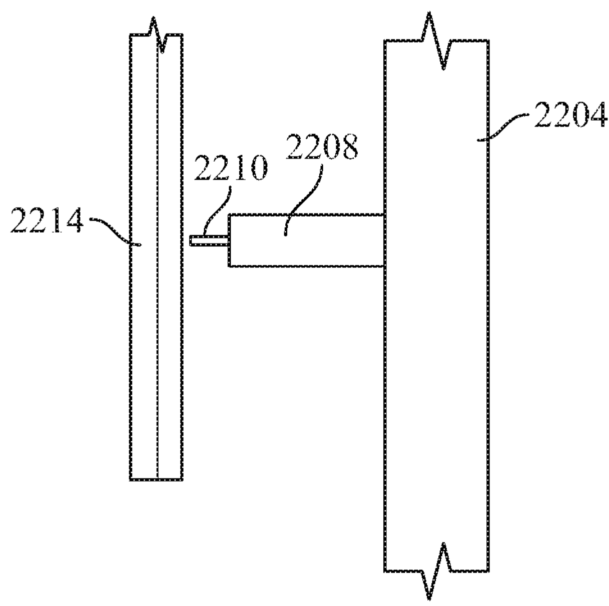
Figure 38:
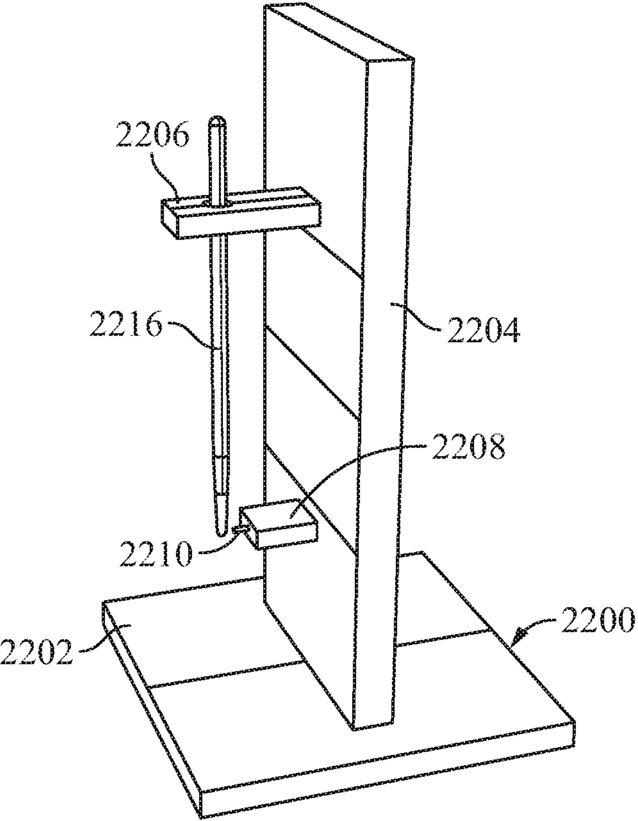

Referring initially to the perspective views of FIGS. 35, 36, and 38, it can be seen that the material testing assembly 2200 comprises a support base 2202 with an upright member 2204 mounted on the support base 2202. An upper support bracket and sensor subassembly 2206 is mounted to a side of the upright member 2204. The upper support bracket and sensor subassembly 2206 may include a sensor (e.g., a transducer touching the material sample at a single point) for measuring the vibrations of a material sample. As shown in FIGS. 35, 36, and 38, the material testing assembly 2200 further comprises a lower air nozzle support member 2208 and an air nozzle 2210 (i.e., one type of excitation device—see FIG. 37) supported above the support base 2202 by means of lower air nozzle support member 2208. As best shown in FIG. 37, the air nozzle 2210 protrudes outwardly from the air nozzle support member 2208. The air nozzle 2210 excites the material sample by discharging compressed air onto the material sample.

Exemplary material samples are depicted in FIGS. 35-38. In FIG. 35, a square wood stock 2212 is shown being disposed in the material testing assembly 2200. In FIGS. 36 and 37, a round wood stock 2214 is shown being disposed in the material testing assembly 2200. In FIG. 38, an exemplary finished product, namely a drum stick 2216 that has been formed from the square wood stock 2212 and/or the round wood stock 2214 is illustrated in the material testing assembly 2200. As such, the material testing assembly 2200 can accommodate raw stock (e.g., dowel or square) or a finished product. For example, the processing of forming the drum stick 2216 may comprise starting with the square wood stock 2212, then forming the square wood stock 2212 into round wood stock 2214, and finally forming the round wood stock 2214 into the final drum stick 2216. Thus, in the illustrative embodiment, the cutout of the upper support bracket and sensor subassembly 2206 may be configured so as to accommodate various cross-sectional geometries (e.g., a diamond-shaped cutout for accommodating various rectangular, square, and round material sample shapes).

Now, an exemplary process using the material testing assemblies 1600, 1700, 1800, 2200 and/or the material support cradles 1900, 2000, 2100 described above will be described. The process described hereinafter is a process for rating materials where use is dependent on the material properties of the object. The material properties of an object define how the object will function when in use. By knowing the materials properties, we can define a best set of properties that will function in an ideal way. This becomes difficult when the material we are using in the product is wood. As an organic material, wood is variable in its material properties. This becomes problematic when performance is important. To make consistently performing products made from wood, a testing and sorting process must be utilized.

In the first step of the exemplary process, the rough wood is machined to a dowel or beam blank of standardized size. In the second step of the exemplary process, a machined blank is loaded into a testing machine (e.g., using one of the material testing assemblies 1600, 1700, 1800, 2200 and/or the material support cradles 1900, 2000, 2100). In the third step of the exemplary process, the testing machine makes a mass measurement. In the fourth step of the exemplary process, the testing machine takes a speed of sound measurement. In the fifth step of the exemplary process, the testing machine takes bending frequencies measurement. In the sixth step of the exemplary process, the material properties are calculated from measurements as follows by the rating computer:

- a. Density (d)
    - i. For dowel:
        - 1. $d=(m/(\pi * r *^{\wedge 2} * 1))$ where:
            - a. m=mass of dowel
            - b. r-radius of dowel
            - c. l=length of dowel
    - ii. for beam:
        - 1. $d=(m/(l * w * h))$ where:
            - a. m=mass of beam
            - b. l=length of dowel
            - c. w=width of beam
            - d. h=thickness of beam
- b. modulus of elasticity (E)
    - i. for dowel and beam
        - 1. $E=d * v^{\wedge 2}$ where
            - a. d=density of rod or beam
            - b. v=speed of sound through rod or beam
- c. Radiation Coefficient
    - i. $rc=\sqrt{}E/d^{\wedge 3}$ where
        - 1. E=modulus of elasticity
        - 2. d=density
- d. Acoustic impedance
    - i. $I=E * d$ where
        - 1. E=modulus of elasticity
        - 2. d=density In the seventh step of the exemplary process, the performance value is calculated (Pv):

- a. for applications where stiffness to weight is the prime consideration
    - ii. $Pv=(rc_{measured}/rc_{max})*10$ where:
        - 1. $rc_{measured}$=calculated radiation coefficient
        - 2. $rc_{max}$=maximum theoretical radiation coefficient value
- b. for applications where energy transfer is the prime consideration
    - iii. $Pv=(I_{measured}/I_{max})*10$ where:
        - 1. $I_{measured}$=calculated acoustic impedance
        - 2. $I_{max}$=maximum theoretical acoustic impedance value Then, in the eighth step of the exemplary process, the blanks are sorted into mass and Pv groups. Finally, in the ninth step of the exemplary process, the blanks are machined into final product.

While the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A material selection system for constructing a musical instrument and/or wherein a selected material is a wood material, comprising:

a rating module comprising:

an excitation device configured to act upon each of a plurality of material samples, a vibration receiver in cooperation with the excitation device, a rating computer coupled to the vibration receiver, the rating computer configured to execute stored instructions for determining a set of material sample ratings based on a transform analysis of data collected by the vibration receiver, and an output device operatively coupled to the rating computer, the output device configured to output the determined set of material sample ratings;

a rating database configured to receive and store a plurality of sets of material sample ratings, each set of material sample ratings associated with a material sample;

a selection module comprising:

a selection computer coupled to the database, the selection computer configured to execute stored instructions for selecting a specific material sample based on user-preferred material characteristics, and a user interface configured to:

receive the user-preferred material characteristics; and transmit an identification of the selected specific material sample; and a material testing assembly for testing the material sample, the material testing assembly including a material support cradle for supporting the material sample, the material testing assembly supporting the material sample with one or more support members contacting the material sample at one or more respective nodal points of the material sample, the one or more respective nodal points corresponding to one or more respective nodes of a desired resonant frequency's modal shape for the material sample, wherein the rating computer configuration for determining the set of material sample ratings is based on the data being collected while the material sample is contacted at the one or more respective nodal points by the one or more support members.

2. The material selection system of claim 1, wherein the rating computer determines a Galloup Base 10 Ratio or Base Scaled Ratio; and wherein the transform analysis performed by the rating computer comprises a Fast Fourier Transform (FFT) analysis of the data collected by the vibration receiver.

3. The material selection system of claim 1, wherein the rating computer determines a deflection prediction.

4. The material selection system of claim 1, wherein the rating computer determines a mass prediction.

5. The material selection system of claim 1, wherein the excitation device and the vibration receiver are provided as part of the material testing assembly.

6. The material selection system of claim 5, wherein the material testing assembly is configured to support the material sample in a horizontal orientation.

7. The material selection system of claim 5, wherein the material testing assembly is configured to support the material sample in a vertical orientation.

8. The material selection system of claim 5, wherein the excitation device comprises at least one of: (i) a compressed air source, and (ii) a sonic driver.

9. The material selection system of claim 5, wherein the vibration receiver comprises a transducer.

10. A material selection system for constructing a musical instrument and/or wherein a selected material is a wood material, comprising:

an excitation device configured to act upon a material sample, a vibration receiver in cooperation with the excitation device, a rating computer coupled to the vibration receiver, the rating computer configured to execute stored instructions for determining a set of ratings associated with the material sample, the set of ratings including:

material sample ratings based on a transform analysis of data collected by the vibration receiver, and an output device operatively coupled to the rating computer, the output device configured to output the determined set of material sample ratings; and a material testing assembly for testing the material sample, the material testing assembly including a material support cradle for supporting the material sample, the material testing assembly supporting the material sample with one or more support members contacting the material sample at one or more respective nodal points of the material sample, the one or more respective nodal points corresponding to one or more respective nodes of a desired resonant frequency's modal shape for the material sample, wherein the rating computer configuration for determining the set of ratings associated with the material sample is based on the data being collected while the material sample is contacted at the one or more respective nodal points by the one or more support members.

11. The material selection system of claim 10, further comprising:

a rating database configured to receive and store a plurality of sets of material sample ratings, each set of material sample ratings associated with a material sample; and a selection module comprising:

a selection computer coupled to the database, the selection computer configured to execute stored instructions for selecting a specific material sample based on user-preferred material characteristics, and a user interface configured to:

receive the user-preferred material characteristics; and transmit an identification of the selected specific material sample.

12. The material selection system of claim 10, wherein the rating computer determines a Galloup Base 10 Ratio or Base Scaled Ratio; and wherein the transform analysis performed by the rating computer comprises a Fast Fourier Transform (FFT) analysis of the data collected by the vibration receiver.

13. The material selection system of claim 10, wherein the rating computer determines a deflection prediction.

14. The material selection system of claim 10, wherein the rating computer determines a mass prediction.

15. The material selection system of claim 10, wherein the excitation device and the vibration receiver are provided as part of the material testing assembly.

16. The material selection system of claim 15, wherein the material testing assembly is configured to support the material sample in a horizontal orientation.

17. The material selection system of claim 15, wherein the material testing assembly is configured to support the material sample in a vertical orientation.

18. The material selection system of claim 15, wherein the excitation device comprises at least one of: (i) a compressed air source, and (ii) a sonic driver.

19. The material selection system of claim 15, wherein the vibration receiver comprises a transducer.

* * * * *